US009451418B2

(12) United States Patent
Joseph et al.

(10) Patent No.: US 9,451,418 B2
(45) Date of Patent: Sep. 20, 2016

(54) GROUP ASSOCIATION BASED ON NETWORK DETERMINED LOCATION

(71) Applicant: QUALCOMM Incorporated, San Diego, CA (US)

(72) Inventors: George Joseph, San Diego, CA (US); Peter S Marx, La Jolla, CA (US); Eric P Bilange, Escondido, CA (US); Leyla S Celebi, San Diego, CA (US); Gaurav Lamba, Los Altos, CA (US); Cormac S Conroy, Palo Alto, CA (US); Praveen Dua, Cupertino, CA (US); Jayal M Mehta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 13/803,598

(22) Filed: Mar. 14, 2013

(65) Prior Publication Data

US 2014/0113674 A1    Apr. 24, 2014

Related U.S. Application Data

(60) Provisional application No. 61/716,361, filed on Oct. 19, 2012.

(51) Int. Cl.
| | |
|---|---|
| *H04B 7/00* | (2006.01) |
| *H04W 4/08* | (2009.01) |
| *H04W 4/02* | (2009.01) |
| *H04W 8/18* | (2009.01) |

(52) U.S. Cl.
CPC .............. *H04W 4/08* (2013.01); *H04W 4/021* (2013.01); *H04W 4/023* (2013.01); *H04W 8/186* (2013.01)

(58) Field of Classification Search
USPC ......... 455/456.1, 456.2, 456.3, 456.4, 456.5, 455/456.6, 457, 517–520; 370/204, 223, 370/227
See application file for complete search history.

(56) References Cited

U.S. PATENT DOCUMENTS

| | | | |
|---|---|---|---|
| 6,542,750 B2 | 4/2003 | Hendrey et al. | |
| 7,031,700 B1 | 4/2006 | Weaver et al. | |
| 7,184,790 B2 | 2/2007 | Dorenbosch et al. | |
| 7,289,814 B2 | 10/2007 | Amir et al. | |
| 2004/0192350 A1 | 9/2004 | Pelaez et al. | |
| 2005/0113123 A1* | 5/2005 | Torvinen ...................... | 455/519 |
| 2005/0192029 A1 | 9/2005 | Aigner et al. | |
| 2007/0237096 A1* | 10/2007 | Vengroff et al. .............. | 370/254 |
| 2009/0170531 A1 | 7/2009 | Hampel et al. | |
| 2012/0271883 A1* | 10/2012 | Montoya et al. ............. | 709/204 |
| 2013/0091209 A1* | 4/2013 | Bennett et al. ............... | 709/204 |
| 2014/0019552 A1* | 1/2014 | Oh ................................ | 709/204 |
| 2014/0025679 A1* | 1/2014 | Mallet et al. ................. | 707/737 |
| 2014/0032673 A1* | 1/2014 | Mallet et al. ................. | 709/204 |
| 2014/0214951 A1* | 7/2014 | Mallet et al. ................. | 709/204 |
| 2014/0214954 A1* | 7/2014 | Mallet et al. ................. | 709/204 |
| 2014/0214981 A1* | 7/2014 | Mallet et al. ................. | 709/206 |
| 2014/0342689 A1* | 11/2014 | Anderson et al. ......... | 455/404.2 |

OTHER PUBLICATIONS

International Search Report and Written Opinion—PCT/US2013/065756—ISA/EPO—Mar. 3, 2014.

* cited by examiner

*Primary Examiner* — Fayyaz Alam
(74) *Attorney, Agent, or Firm* — Gerald P. Joyce, III; Satheesh K. Karra

(57) ABSTRACT

Systems, methods, and devices enable group associations based on network determined location information. The various embodiments enable the ad-hoc creation of mobile device groups based on network determined locations. In an embodiment, a server may determine the location of a mobile device and based on the mobile device being located in a pairing zone may add the mobile device to a group. In an embodiment, the server may add the mobile device to the group following the occurrence of a trigger event, such as the mobile device pausing in a given pairing zone for a period of time. In an embodiment, the server may identify that mobile devices are located within a pairing zone and may add all the mobile devices in the pairing zone to the same group.

80 Claims, 16 Drawing Sheets

US 9,451,418 B2

GROUP ASSOCIATION BASED ON NETWORK DETERMINED LOCATION

RELATED APPLICATIONS

This application claims the benefit of priority to U.S. Provisional Patent Application No. 61/716,361 entitled "Group Association Based On Network Determined Location" filed Oct. 19, 2012, the entire contents of which are hereby incorporated by reference.

BACKGROUND

Current location based applications generally rely on mobile device performed location determinations (e.g., mobile device location determinations made using an installed Global Positioning System ("GPS") receiver) to provide location information. Thus, mobile devices without a location determination capability (e.g., non-GPS enabled devices), may not be able to use current location based applications because these mobile devices may not be able to provide location information. Further, many location based systems, especially group location systems, require a mobile device to run one or more specific application resident on the mobile device and provide periodic position check-ins. The specific applications increase the cost of such systems because they often must be tailored to be device specific (e.g., tailored to the operating system, hardware, updates, etc.). Additionally, requiring the mobile device to determine its location, whether with GPS or by other methods, and periodically check-in may consume undesirable amounts of processing capability and/or battery life.

SUMMARY

The systems, methods, and devices of the various embodiments provide group associations based on network determined location information. The various embodiments enable mobile devices to participate in groups based on the network determining the locations of the mobile devices, and recognizing when mobile devices are in or near certain locations and/or positioned close together, which identifies the mobile devices are part of a defined group. Additionally, the various embodiments enable the ad-hoc creation of mobile device groups based on network determined locations of mobile devices. In an embodiment, a server may determine the locations of mobile devices and, based one or more of the mobile devices being located in a pairing zone, add the mobile devices located in the pairing zone to a group or define a group as those mobile devices located in the pairing zone at the same time. In a further embodiment, the server may add the mobile device to a group following the occurrence of a trigger event, such as the mobile device pausing in a given pairing zone for a period of time. In an embodiment, the server may add all mobile devices determined to be within the pairing zone to the same group.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
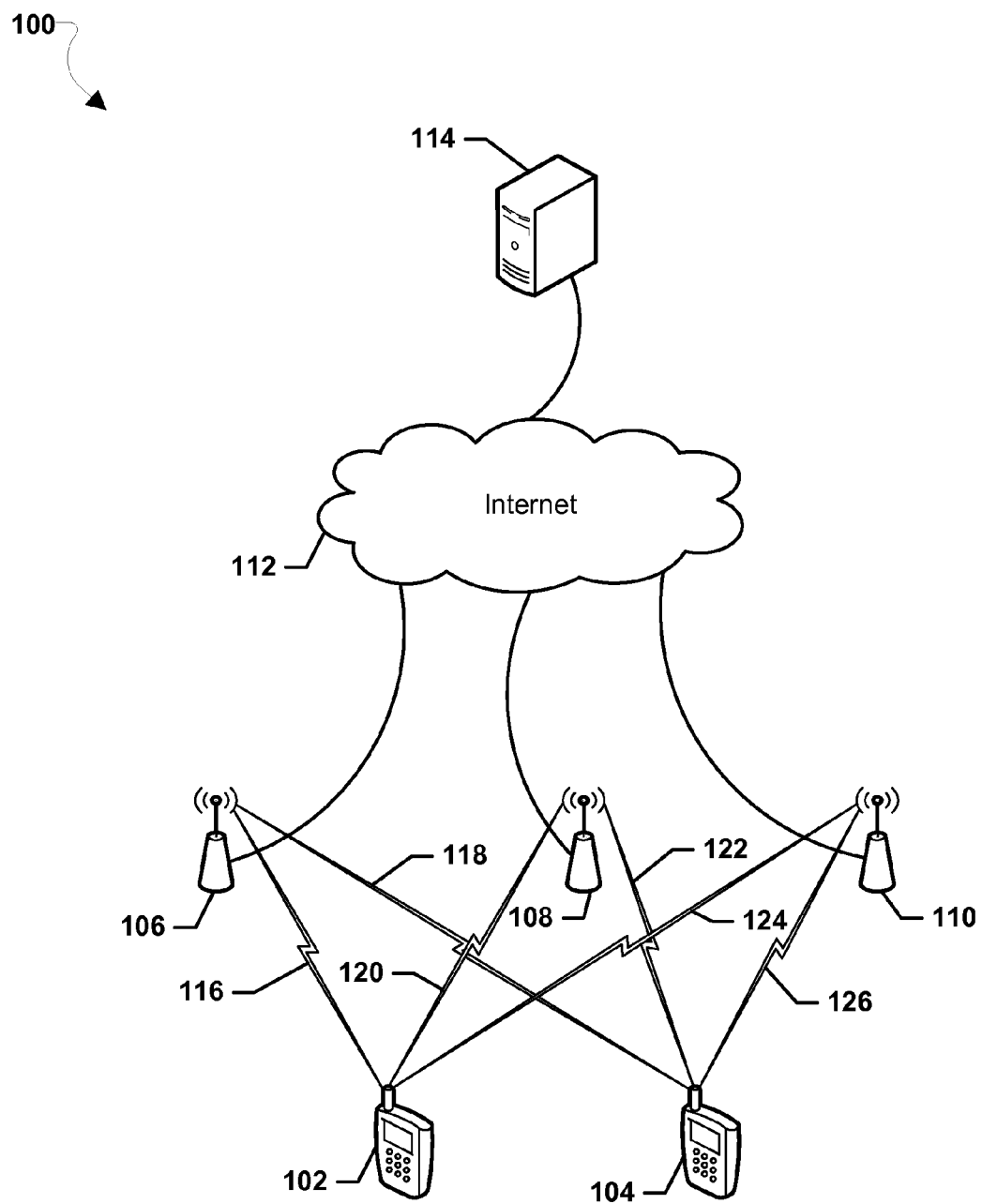
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "receiver device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic devices which include a programmable processor and memory and circuitry for sending data to a wireless network access point.

The various embodiments are described herein using the term "server." The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on mobile devices. A light server or secondary server may be a slimmed-down version of server type functionality that can be implemented on a mobile device thereby enabling it to function as an Internet server (e.g., an enterprise e-mail server) only to the extent necessary to provide the functionality described herein.

The various embodiments provide group associations based on network determined location (e.g., latitude, longitude, and/or elevation) information. The various embodiments enable mobile devices to participate in groups that are determined or organized based on the locations of the mobile devices that may be determined from network interactions with the mobile devices. Additionally, the various embodiments enable the ad-hoc creation of mobile device groups based on determined locations of mobile devices. In an embodiment, the server may generate or define a group as all mobile devices that are determined to be located within a pairing zone at a particular time. In an embodiment, a server may determine the location of a mobile device and based on the mobile device being located in a pairing zone may add the mobile device to a group. In a further embodiment, the server may add the mobile device to the group following the occurrence of a trigger event, such as the mobile device pausing in a given pairing zone for a period of time. In an embodiment, the location of the mobile device may be determined based on signal information available to an access point or to the mobile device. In an embodiment, the signal information may be sent by the mobile device or may be received by the mobile device. The signal information may allow access point to provide channel state and/or Round Trip Time for a particular mobile device, and may include network pages, requests to identify access points, signal strength requests, quality of service requests, identification information requests, etc. In an embodiment, the interaction between mobile devices and the network may be network management signals that are associated with establishing and maintaining a wireless wide area network, such as WiFi or cellular data networks.

In the various embodiments, network based positioning may be used to determine group associations. In further embodiments, various triggers may be used in conjunction with network based positioning to determine group associations among mobile devices. The various embodiments enable a network to determine mobile device positions determinations, which may enable users to actively participate in groups, associations, and activities without a specific application and/or mobile device based position check-in. Triggers may include time, the providing of information (such as pictures, user information, etc.), requests for information made by a mobile device, or other environmental factors (e.g., being within a defined proximity of a specific user/mobile device, event, etc.).

In an embodiment, a server monitoring positions of mobile devices may determine when a user carrying a mobile device enters a specific geographic location (i.e., a pairing zone), and in response add the user's mobile device to a defined group. In another embodiment, a server monitoring positions of mobile devices may determine when more than one mobile device enters a specific geographic location (i.e., a pairing zone) at the same time and/or for a defined duration, and in response define an ad hoc group as all of the mobile devices within the pairing zone at that particular time.

A group may be set of associated mobile devices, such as a set of associated mobile devices in communication with the same wireless network. A group may be defined in a memory available to a server, such as a memory available to a wireless network server with which the mobile devices of the group are in communication. As an example, a user carrying a mobile device may cross a specific geographic boundary (e.g., by entering a specific floor of a building, crossing into a specific room, etc.) and when the network determined location indicates the user's mobile device crossed the specific geographic boundary, the server may add the user's mobile device to a group of all mobile devices that have crossed the specific geographic boundary. In this manner, an ad-hoc group of all mobile devices that enter a specific geographic location may be created. In an embodiment, the various additional triggers beyond merely entering the specific geographic location (i.e., pairing zone) may need to occur before the user's mobile device may be added to the group. Specific triggers may include an expiration of a time period, a mobile device context, sending of user information (e.g., user registration information, virtual card, etc.), navigating a web browser on the mobile device to a specific uniform resource locator ("URL"), sharing of media (e.g., uploading a picture), etc. As an example, a trigger may be a time period, such as 20 seconds. In addition to entering the pairing zone, the mobile device may be required remain in the pairing zone for longer than the trigger time period of 20 seconds to be added to the group.

In the various embodiments, once a mobile device is added to the group, various rewards, advertisements, information, contextual applications, or other data may be provided to the mobile device and/or mobile device user. In further embodiments, additional location tracking may enable group and/or individual user location based challenges, such as scavenger hunts, to be provided for the group members, and additional rewards, advertisements, information, contextual applications, or other data to be provided to the group and/or individual based on the results of the location based challenges.

In various embodiments the locations of mobile devices may be determined by the network based on interactions with the mobile devices, such as communication data packets and link-management signals (e.g., signals exchanged to maintain a wireless connection) associated with a wireless network, and location reports (e.g., GPS coordinates) communicated from mobile devices to the network. In an example embodiment, the location (e.g., latitude, longitude, and/or elevation) of a mobile device may be determined using a trilateration algorithm based on signal information available to wide area network (WAN) access point transceivers. As an example, the mobile device may be in communication with three or more WAN access points (e.g., Wi-Fi® access points, Wi-Fi® beacon, Wi-Fi® transceiver, Wi-Fi® router, etc.) of a wireless network. Based on the coverage maps of each access point a server may determine the location of the mobile device using trilateration algorithm based on the three or more access points. In an embodiment, a coverage map may correlate the signal arc (e.g., signal propagation area) covered by an access point with the geographic coordinates encompassed by the signal arc. In an embodiment, the server may determine the location of the mobile device based on characteristics of the connection between the mobile device and one or more access point (e.g., Wi-Fi® access points, Wi-Fi® beacon, Wi-Fi® transceiver, Wi-Fi® router, etc.) of a wireless network. Characteristics of the connection may include quality of service measurements, signal strength measurements, and error rate measurements. In an embodiment, a coverage map may correlate known connection characteristics with distances/locations relative to the access point.

In an embodiment, a set of users each carrying a mobile device (e.g., a family in which each family member may be carrying his or her own smart phone) may visit the same venue (e.g., an amusement park, zoo, etc.). Upon entering the venue the set of user's may stand together in a specific geographic area for time period. As an example, when entering an amusement park, families often stand together to have a picture taken. In an embodiment, a server may recognize that the set of users carrying mobile devices stood together in the specific geographic location for a period of time (e.g., the twenty seconds to get a picture taken in an amusement park entry way), and may associate the mobile devices carried by the users as a group. In an embodiment, the server may determine the location of each mobile device based on communications between the mobile device and one or more wireless access points (e.g., Wi-Fi® access points) located in the venue. As an example, an amusement park may be equipped with a series of Wi-Fi® access points which may provide wireless Internet service in the amusement park. A server may monitor communications between mobile devices and each Wi-Fi® access point, such as management signals (e.g., probe requests), and recognize that each mobile device carried by a family member is in communication with one or more Wi-Fi® access points (e.g., three Wi-Fi® access points) based on the management signals. The server may determine the location of each mobile device, for example using trilateration, and may determine that the mobile devices of the family members paused together in the same geographic area (e.g., the amusement park entry way, a photo booth area, a specifically identified pairing circle, etc.) for at least a trigger period (e.g., twenty seconds). Based on the mobile devices being located in the same geographic area together for the trigger period, the server may associate the mobile devices of the family members as a group, such as by storing the media access control address or identification ("MAC ID") and/or internet protocol address ("IP address") of each family member's mobile device in the same data table in a memory (e.g., a database) available to the server. In a further embodiment, an additional trigger may include that the mobile devices may be required to access the same URL, such as a URL for a registration page, in order to be added to the group. As an example, the server may recognize a hyper text transport protocol ("HTTP") GET request message for information at the URL http://www.mapofmygroup.com as an additional trigger. Based on determining that the mobile devices of the family members paused together in the same geographic area, for at least a trigger period, and all sent HTTP GET requests associated with http://www.mapofmygroup.com, the server may associate the mobile devices of the family members as a group.

In an embodiment, once a group is created (e.g., the grouped family member's mobile devices in an amusement park), the server may track the location of each of the grouped mobile devices in the venue (e.g., in the amusement park). As an example, the server may determine the location of each mobile device, such as by trilateration, periodically (e.g., on a fixed interval, upon discovery of the mobile device by a new Wi-Fi® access point, etc.). In an embodiment, when a mobile device associated with a group makes a request for content (e.g., an HTTP GET request), the server may modify the request and/or content based on the group the mobile device is in. As an example, an HTTP GET request for an amusement park map from a family member's mobile device may be modified to indicate the request came from a mobile device of the group associated with the family. In this manner, contextual content, such as a map of the amusement park tailored for the specific family (e.g., showing a pre-planned route to follow to visit the desired rides of the family), from the web server of the amusement park may be provided to the requesting family member's mobile device. In an additional example, the server may modify content provided to the requesting family member group device to create contextual content, such as by modifying an amusement park map to graphically indicate the current locations (e.g., latitude, longitude, and/or elevation) of each family member mobile device. In a further embodiment, the grouping of mobile devices may enable sharing of information and/or group communication among the members of the group. As an example, by being added to the same group the family member's mobile devices may be enabled to share photos, exchange messages, etc. with any other family member group mobile devices.

In another embodiment, a set of users each carrying a mobile device (e.g., executives each carrying a smart phone) may visit the same venue (e.g., a conference, tradeshow, etc.). In an embodiment, a server may determine the location of each mobile device in the venue based on interactions (e.g., network management signals used to establish or maintain a wireless communication link, such as network pages, probe requests, signal quality requests, power requests, etc.) between each mobile device and one or more wireless access points (e.g., Wi-Fi® access points) located in the venue. As an example, a convention floor may be equipped with a series of Wi-Fi® access points that may provide wireless Internet service in the convention. A server may monitor communications between each mobile device and each Wi-Fi® access point and recognize that each mobile device carried by attendees of the convention is in communication with one or more Wi-Fi® access points (e.g., three Wi-Fi® access points). The server may determine the location of each mobile device, for example using trilateration based on network interactions with each mobile device. In an embodiment, the fact that a mobile device crossed a specific geographic boundary (e.g., entered a specific geographic area such as an executives only area), may trigger the server to add the mobile device crossing the specific geographic boundary to a group (e.g., a group of mobile devices carried by executives). As an example, any mobile device that enters an executives only area or conference room may be added to a group of executive mobile devices. In this manner, the mobile devices need not be in the executives only area at the same time, merely crossing the specific geographic boundary to enter the executives only area at any time during the conference may result in the mobile device being added to the executive group. In this manner, targeted advertising, information, coupons, rewards, discounts, etc. intended for executives may be provided to only the executive group. In another embodiment, an ad-hoc group may be created in the venue based on mobile devices that pause for longer than a trigger period in a specific geographic location. As an example, an advertiser may wish to create a group of all attendees who saw a specific billboard at a tradeshow. Any mobile device that stops in front of the billboard (i.e., a specific geographic area) for longer than 10 seconds (i.e., a trigger period) may be added to a group. Thus, even though the mobile devices may not be present in the geographic area for the same period of time, they may be added to the same group. In this manner, the advertiser may send additional information, rewards, discounts, etc. only to the mobile devices of attendees who actual saw the billboard at the tradeshow. Additionally, the advertiser may maintain the group even outside the venue (e.g., after the tradeshow) and send the reward to the group at a later time. In a similar example, a booth operator at a tradeshow may wish to create a group of the attendees who visited the booth for a trigger period of time (e.g., five minutes). In this manner, the booth operator may create the group without requiring the attendees to take any action, such as providing a business card, scanning a badge, etc. because the attendee may be added based on network determined location information.

In an embodiment, once a group is created (e.g., the grouped family member's mobile devices in an amusement park, executives at a convention, attendees at a tradeshow, etc.), the server may track the location of each of the grouped mobile devices in the venue (e.g., in the amusement park, convention, tradeshow, etc.). As an example, the server may determine the location of each mobile device, such as by trilateration, periodically (e.g., on a fixed interval, upon discovery of the mobile device by a new Wi-Fi® access point, etc.). In an embodiment, the tracking of mobile devices may enable the server to provide location challenges to the group members. As an example, a scavenger-hunt type game may be provide in which rewards (e.g., points, badges, coupons, prizes, etc.) are provided to all group members and/or individual group members for entering one or more locations in the venue (e.g., visiting a set number of rides in an amusement park, visiting a set number of booths at a tradeshow, entering all display halls at a convention, etc.). Rewards may be sent to the individuals and/or groups based on the completion of the location challenge. For example, a coupon may be provided to each group member should all group members visit a particular booth at a tradeshow.

In the various embodiments the determination of location, creation of groups, and/or adding of mobile devices to groups may be performed in real-time. For example, as mobile devices enter a pairing zone the mobile devices may be added to an ad-hoc group.

In other embodiments, at least a portion of the operations related to the determination of location, creation of groups, and/or adding of mobile devices to groups may be performed as part of post event data analysis. As an example, a Wi-Fi® based network may track and store connection information for mobile devices using the network and the stored connection information may be analyzed to determine the location of a mobile device during post event data analysis. As another example, a Wi-Fi® based network may determine location for mobile devices and store the location determinations. In an embodiment, determined locations may be used by a server to generate a database of location history information for the tracked individuals. Post event data analysis or analytics using such a database of location history information may enable the creation of groups based on network determined location information based on additional environmental factors, such as location in an area at a specific time, proximity to an individual, patterns of behavior, etc. As an example, the data from an amusement park may be analyzed to identify which mobile devices may have been near a location at which a missing child was last seen and a group may be created of those devices. In this manner, a missing child alert may be sent to those grouped mobile devices asking for information about the missing child. As another example, data from wireless network may be analyzed to identify which mobile devices came in contact with a known illness carrier (e.g., individual infected with a communicable disease), and those mobile devices who came within a given proximity (e.g., five feet) of the illness carrier over a time period when the illness carrier may have been contagious may be grouped together. In this manner, the users of the identified mobile devices may be informed of a need to seek medical attention based on potential exposure to the illness. Additionally, the various embodiments may be used for sex offender tracking and notification of groups of mobile devices that came in contact with the sex offender.

In an embodiment, a group may be created including a mobile device and a fixed (e.g., a less mobile device such as an item on sale in a store, front gate turnstile and/or entry way, printer, or other device which generally remains in a fixed location during operation). As an example, a consumer carrying a mobile device may be associated with a television in a store by server based on the mobile device being located in the same geographic area with the television for the trigger period. In this manner, the server may associate the television and the consumer as a pair. As another example, a user carrying a mobile device may be associated with a front gate of an amusement park by a server based on the mobile device passing through the front gate. In this manner, the server may track the entry and exit of user from the amusement park via the front gate association.

FIG. 1 illustrates a network 100 suitable for use with the various embodiments. The network 100 may include mobile devices 102, 104 (e.g., smart phones), access points 106, 108, 110 (e.g., Wi-Fi® access points, Wi-Fi® beacons, Wi-Fi® transceivers, Wi-Fi® routers, etc.), and one or more servers 114 connected to the Internet 112. The mobile device 102 may establish a wireless connection 116 with the access point 106, a wireless connection 120 with the access point 108, and a wireless connection 124 with the access point 110. The mobile device 104 may establish a wireless connection 118 with the access point 106, a wireless connection 122 with the access point 108, and a wireless connection 126 with the access point 110. The access points 106, 108, 110 may be connected to the Internet 112 and/or another network such as a local area network connected to the one or more servers 114. In this manner, the mobile devices 102, 104 and the one or more servers 114 may all exchange data with each other via the access points 106, 108, 110 and Internet 112 (or local area network connected to the one or more servers 114).

Figure 2A:
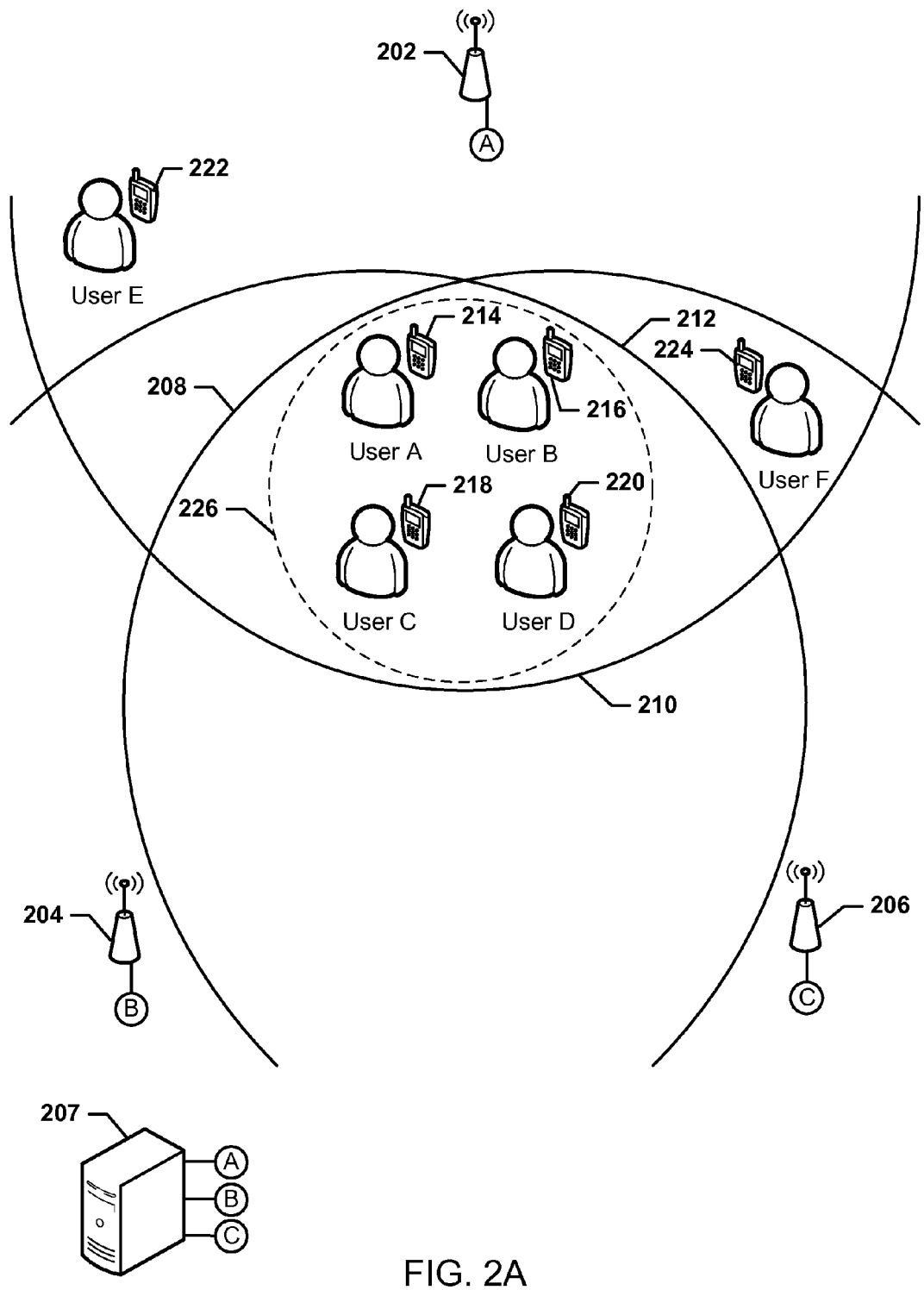
FIG. 2A is a system block diagram illustrating an embodiment system enabling network based positioning and group creation.

FIG. 2A illustrates an embodiment system enabling network based positioning and group creation. The network may include access points 202, 204, and 206 (e.g., Wi-Fi® access points, Wi-Fi® beacons, Wi-Fi® transceivers, Wi-Fi® routers, etc.) connected to a server 207 via connections A, B, and C respectively. Connections A, B, and C may be any type connections, such as wired and/or wireless connections (e.g., connections via a local area network and/or the Internet) enabling the server 207 and access points 202, 204, and 206 to exchange information. In an embodiment, a memory available to the server 207 may include coverage maps associated with each access point 202, 204, and 206 which may correlate the signal arc (e.g., signal propagation area) covered by an access point with the geographic coordinates (e.g., latitude, longitude, and/or elevation) encompassed by the signal arc. In a further embodiment, a coverage map may also correlate signal characteristics, such as a quality of service measurements, error rate measurements, signal strength measurements, etc., with geographic coordinates encompassed by the signal arc of the access point. The coverage map for access point 202 may correlate the signal arc 210 with the geographic coordinates encompassed by the signals from access point 202. The coverage map for access point 204 may correlate the signal arc 212 with the geographic coordinates encompassed by the signals from access point 204. The coverage map for access point 206 may correlate the signal arc 208 with the geographic coordinates encompassed by the signals from access point 206. In an embodiment, a pairing zone 226 may defined. The pairing zone 226 may be a geographic location defined in a memory available to the server 207, and mobile devices located within the pairing zone 226 may be added to a group by the server 207. The network may determine the location of users carrying mobile devices, such as User A carrying mobile device 214, User B carrying mobile device 216, User C carrying mobile device 218, User D carrying mobile device 220, User E carrying mobile device 222, and User F carrying mobile device 224, based on the communications between the mobile devices 214, 216, 218, 220, 222, and/or 224 and the access points 202, 204, and/or 206, such as network management signals sent/received by the mobile devices 214, 216, 218, 220, 222, and/or 224 and the access points 202, 204, and/or 206. In an embodiment, the server 207 may determine the location of the mobile devices 214, 216, 218, 220, 222, and/or 224 based on comparing the access points 202, 204, and/or 206 to which the mobile devices 214, 216, 218, 220, 222, and/or 224 are communicating with to coverage maps of the access points 202, 204, and/or 206. In an embodiment, the location of the mobile devices 214, 216, 218, 220, 222, and/or 224 may be based on trilateration between the access points 202, 204, and 206. In an embodiment, the server 207 may determine the location of the mobile devices 214, 216, 218, and 220 is within the pairing zone 226 and the server 207 may create and/or add mobile devices 214, 216, 218, and 220 and their respective User's A, B, C, and D to a group. In a further embodiment, other triggers beyond the location of mobile devices 214, 216, 218, and 220 in the pairing zone 226 may be required to occur before the mobile devices 214, 216, 218, and 220 may be added to a group. In an embodiment, a trigger may be time based, such as a requirement that the mobile devices 214, 216, 218, and 220 remain in the pairing zone 226 for a specific period of time (e.g., 20 seconds) or longer before being added to the group. In another embodiment, a trigger may be based on other factors, such as requiring the mobile devices 214, 216, 218, and 220 to navigate to a specific URL, complete a web registration, provide a photo, etc.

As an example, FIG. 2A may illustrate a front gate portion of a Wi-Fi® network established within an amusement park. The pairing zone 226 may be a physically represented on the ground, such as by a painted circle at the front gate. Users A, B, C, D, E, and F may be visitors to the amusement park. Further, Users A, B, C, and D may be a family visiting the park together. The server 207 may determine the location of each of Users A, B, C, D, E, and F based on communications between their respective mobile devices 214, 216, 218, 220, 222, and 224. The server 207 may determine User F's location based on mobile device 224 being associated with access point 202 and access point 206. The server may determine User E's location based on mobile device 222 being associated with access point 202. The server 207 may determine neither User E nor User F are located within the pairing zone 226 based on neither mobile device 222 nor mobile device 224 being associated with access point 204. The server 207 may determine based on the coverage maps of access points 202, 204, and 206 that the pairing zone 226 is covered by signal arcs 208, 210, and 212 of access points, 206, 202, and 204, respectively. The server 207 may determine the location of Users A, B, C, and D based on mobile devices 214, 216, 218, and 220 being associated with access points 202, 204, and 206, and may determine mobile devices 214, 216, 218, and 220 are located in the pairing zone 226. The server 207 may create a group and add mobile devices 214, 216, 218, and 220 to the group. In this manner, the family members, User A, User B, User C, and User D, may be added to a group by entering the pairing zone 226 together, while User E and User F may not be added to the family's group because mobile devices 222 and 224 were not in the pairing zone 226.

Figure 2B:
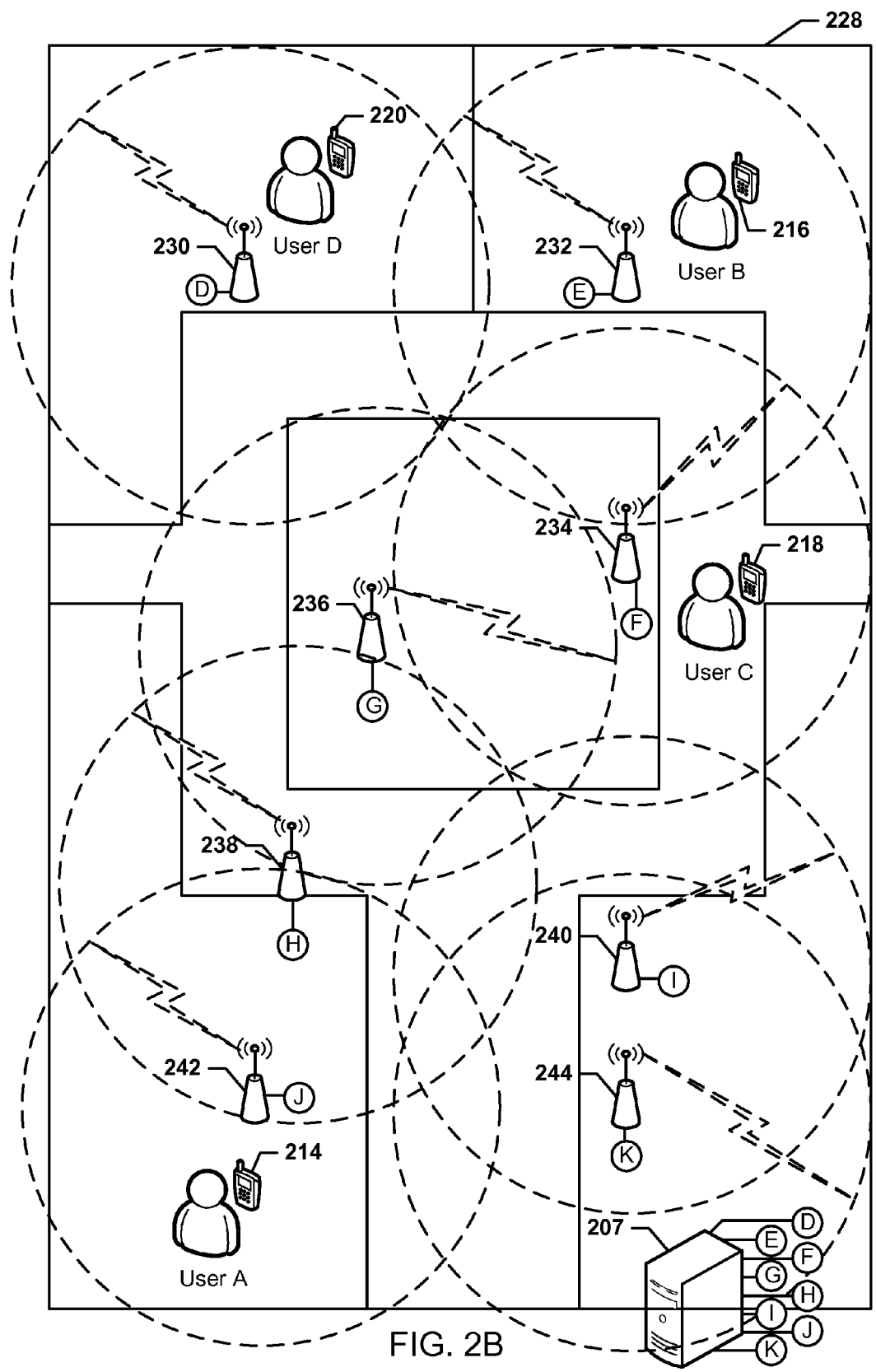
FIG. 2B is a system block diagram illustrating another portion of the embodiment system illustrated in FIG. 2A.

FIG. 2B is a system block diagram illustrating another portion of the embodiment system illustrated in FIG. 2A. The network may include additional access points 230, 232, 234, 236, 238, 240, 242, and 244 (e.g., Wi-Fi® access points, Wi-Fi® beacons, Wi-Fi® transceivers, Wi-Fi® routers, etc.) connected to the server 207 via connections D, E, F, G, H, I, J, and K respectively. Connections D, E, F, G, H, I, J, and K may be any type connections, such as wired and/or wireless connections (e.g., connections via a local area network and/or the Internet) enabling the server 207 and access points 230, 232, 234, 236, 238, 240, 242, and 244 to exchange information. In an embodiment, a memory available to the server 207 may include coverage maps associated with each access point 230, 232, 234, 236, 238, 240, 242, and 244 which may correlate the signal arc (e.g., signal propagation area) covered by an access point with the geographic coordinates (e.g., latitude, longitude, and/or elevation) encompassed by the signal arc. In a further embodiment, a coverage map may also correlate signal characteristics, such as a quality of service measurements, error rate measurements, signal strength measurements, etc., with geographic coordinates encompassed by the signal arc of the access point. In an embodiment, the access points 230, 232, 234, 236, 238, 240, 242, and 244 may be distributed throughout a venue 228 (e.g., an amusement park) to communicate with mobile devices 214, 216, 218, and 220 within the venue 228, such as to provide Internet access to the mobile devices 214, 216, 218, 220 as Users A, B, C, and D travel throughout the venue.

Continuing with the example of the amusement park discussed above with reference to FIG. 2A, the venue 228 illustrated in FIG. 2B may be the attraction portion of amusement park. The server 207 may track the family group of Users A, B, C, and D as the Users A, B, C, and D travel throughout the amusement park based on communications between their respective mobile devices 214, 216, 218, and/or 220 and the access points 230, 232, 234, 236, 238, 240, 242, and/or 244. The server 207 may periodically and/or on-demand determine the location of User's A, B, C, and D. In an embodiment, the server 207 may continually track the location of all family group member mobile devices 214, 216, 218, and/or 220, and may make the determined location information for each mobile device 214, 216, 218, and/or 220 available to each mobile device 214, 216, 218, and/or 220 and/or other mobile devices, applications, servers, etc.

Figure 2C:
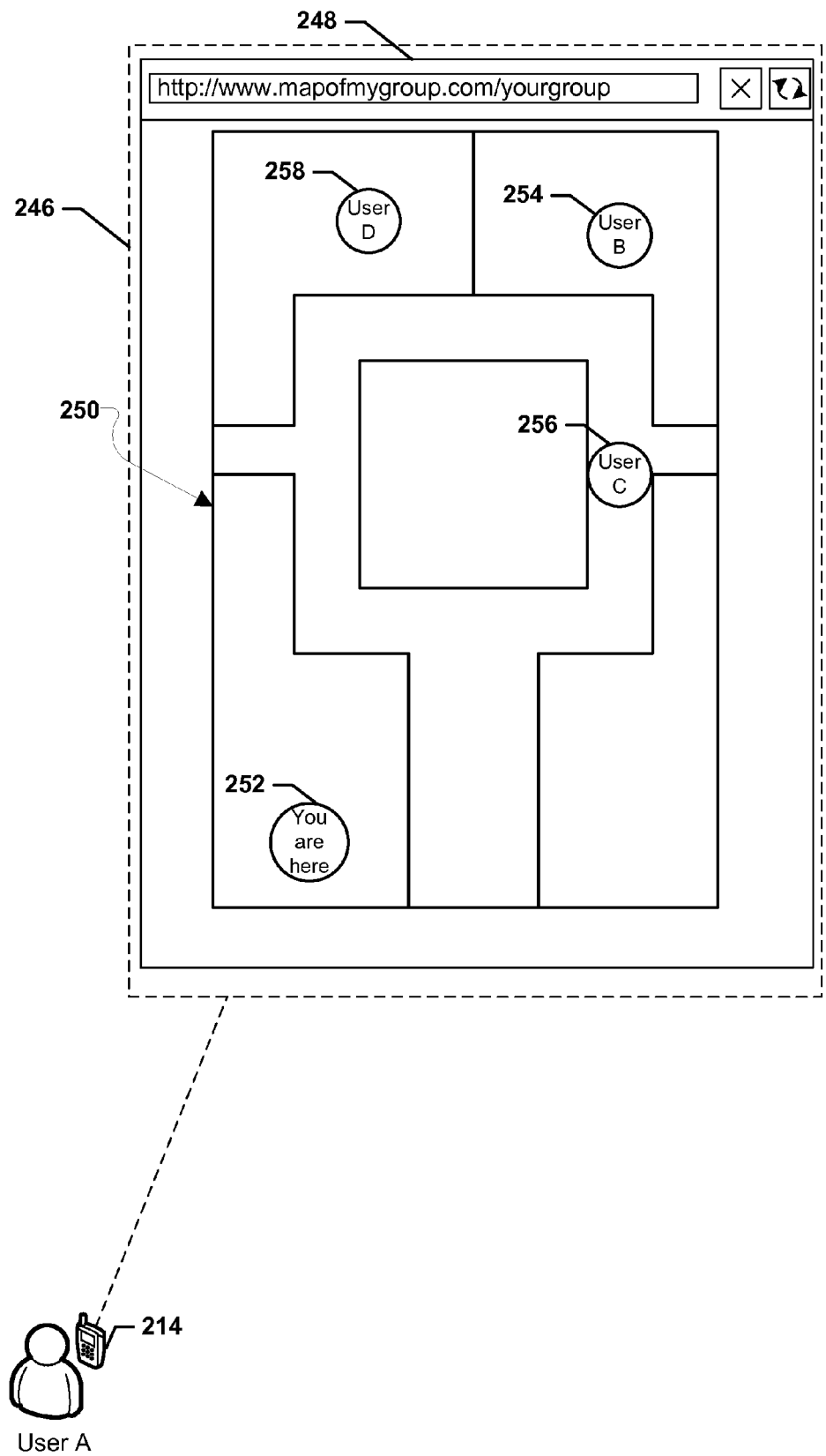
FIG. 2C illustrates an embodiment user interface of a mobile device operating in the system illustrated in FIG. 2B.

FIG. 2C illustrates an embodiment user interface 246 (e.g., display) of the mobile device 214 operating in the system illustrated in FIG. 2B. In an embodiment, the mobile device 214 may render content received from the server 207 indicating the location of the Users A, B, C, and D. Continuing with the example discussed above with reference to FIGS. 2A and 2B, User A may direct the web browser 248 of the mobile device 214 to the URL http://www.mapofmygroup.com/yourgroup. The server 207 may receive the HTTP GET request associated with the URL from the mobile device 214 and may generate and/or modify a map of the amusement park 250 at that URL graphically indicating the current position of User A 252, User B 254, User C 256, and User D 258. The mobile device 214 may receive this contextual content from the server 207 (i.e., the generated and/or modified map of the amusement park 250) and may render the generated and/or modified map of the amusement park 250 graphically indicating the current position of User A 252, User B 254, User C 256, and User D 258 in the web browser 248. In this manner, User A may be provided with contextual content indicating the location of the family group members Users A, B, C, and D by the network as the family explores the amusement park.

In another embodiment, access points may estimate a range to a mobile device based on signal characteristics from signals received from the mobile device. Since the transmit power of a mobile device WAN transceiver may be known or estimated, the distance between the access point and the mobile device may be estimate based on a presumed transmitter power level and a $1/R^2$ propagation model. Alternatively, the access point may poll the mobile device to report the signal strength of its own transmissions (i.e., ask the mobile device to report how strong the access point's signals appear), and knowing the access points transmitter power estimate the separation distance using a $1/R^2$ propagation model. When three or more access points estimate separation distances in this manner, an estimated location of the mobile device may be calculated by the server using the known locations of the access points, the three range estimates and well known trilateration algorithms.

Figure 3:
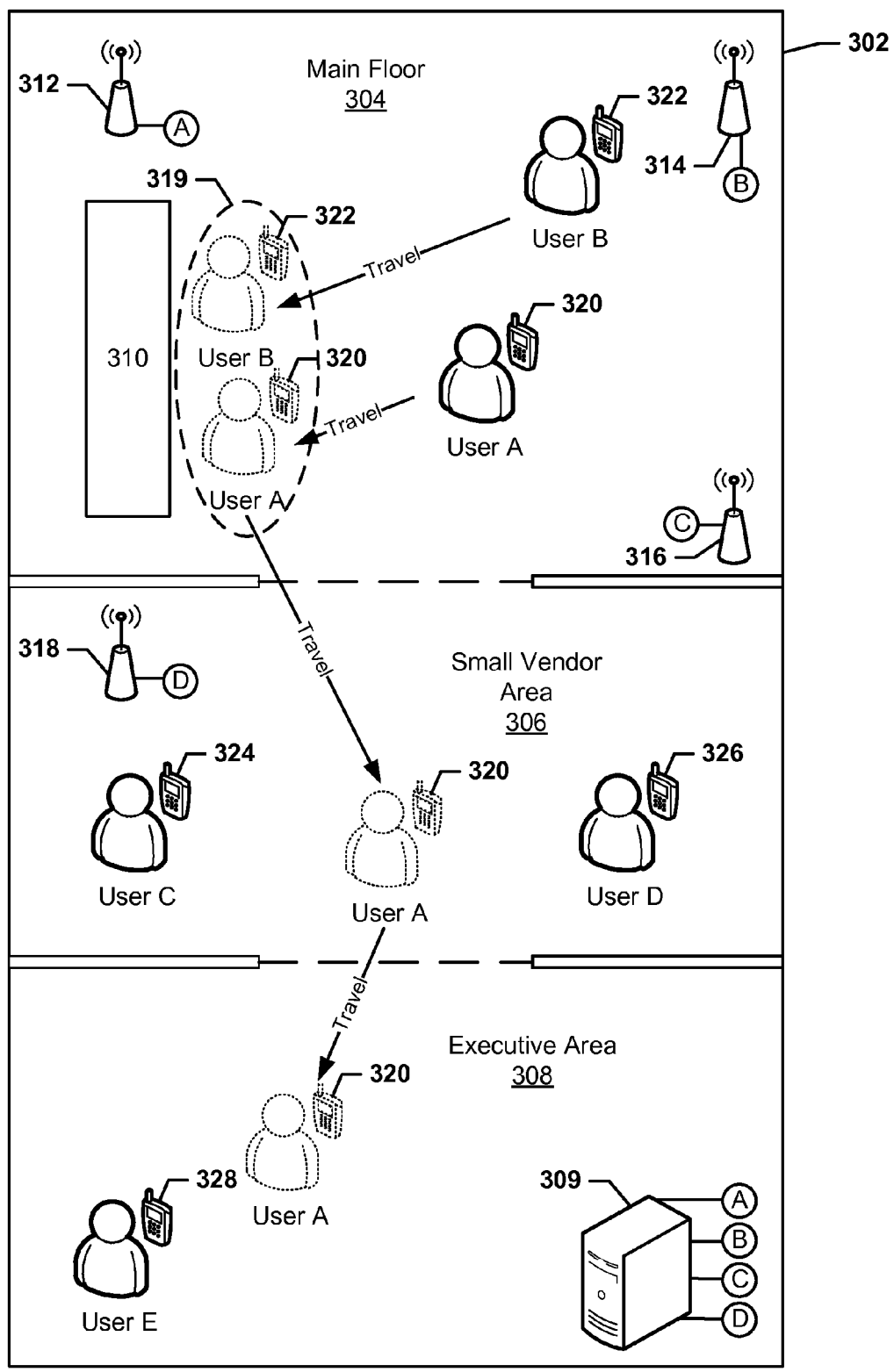
FIG. 3 is a system block diagram illustrating another embodiment system enabling network based positioning and group creation.

FIG. 3 is a system block diagram illustrating another embodiment system enabling network based positioning and group creation. The network may include access points 312, 314, 316, and 318 (e.g., Wi-Fi® access points, Wi-Fi® beacons, Wi-Fi® transceivers, Wi-Fi® routers, etc.) connected to a server 309 via connections A, B, C, and D respectively. Connections A, B, C, and D may be any type connections, such as wired and/or wireless connections (e.g., connections via a local area network and/or the Internet) enabling the server 209 and access points 312, 314, 316, and 318 to exchange information. In an embodiment, a memory available to the server 309 may include coverage maps associated with each access point 312, 314, 316, and 318 which may correlate the signal arc (e.g., signal propagation area) covered by an access point with the geographic coordinates (e.g., latitude, longitude, and/or elevation) encompassed by the signal arc. In a further embodiment, a coverage map may also correlate signal characteristics, such as a quality of service measurements, error rate measurements, signal strength measurements, etc., with geographic coordinates encompassed by the signal arc of the access point. In an embodiment, pairing zones 319 and 308 may be defined. The pairing zones 319 and 308 may be geographic locations defined in a memory available to the server 309, and mobile devices located within the pairing zone 319 and 308 may be added to groups by the server 309. As an example, pairing zone 319 may be a geographic area located in front of a billboard 310 and a trigger, such as a requirement that a mobile device linger in the pairing zone 319 for a period of time (e.g., five seconds) may be associated with the pairing zone 319. As another example, pairing zone 320 may be a specific room or area of a venue 302, such as an executive area 308, and a trigger, such as crossing a geographic boundary from the small vendor area 306 to the executive area 308, may be associated with the pairing zone 308.

In an embodiment, the network may determine the location of users carrying mobile devices, such as User A carrying mobile device 320, User B carrying mobile device 322, User C carrying mobile device 324, User D carrying mobile device 326, and User E carrying mobile device 328, based on the communications between the mobile devices 320, 322, 324, 326, and/or 328 and the access points 312, 314, 316, and 318, such as network management signals sent/received by the mobile devices 320, 322, 324, 326, and/or 328 and the access points 312, 314, 316, and 318. In an embodiment, the server 309 may determine the location of the mobile devices 320, 322, 324, 326, and/or 328 based on comparing the access points 312, 314, 316, and 318 to which the mobile devices 320, 322, 324, 326, and/or 328 are communicating with to coverage maps of the access points 312, 314, 316, and 318. In an embodiment, the location of the mobile devices 320, 322, 324, 326, and/or 328 may be based on trilateration between the access points 312, 314, 316, and 318. In an embodiment, the location of the mobile devices 320, 322, 324, 326, and/or 328 may be based on characteristics of the connections between the mobile devices 320, 322, 324, 326, and/or 328 the access points 312, 314, 316, and 318. In this manner, though the mobile devices 320, 322, 324, 326, and/or 328 may only be in communication with one access point 312, 314, 316, or 318, characteristics of the connections may be compared to the coverage maps of the access point 312, 314, 316, or 318 to determine the location of the mobile device. As an example, mobile device 320 may only be in communication with access point 318 when User A is in the small vendor area 306 and executive area 308, but the server 309 may determine User A's location is in the executive area 308 versus the small vendor area 306 because the signal strength measurements in the executive area 308 which is farther from the access point 318 may be lower than measurements in the small vendor area 306. In an embodiment, connection characteristics may be determined at least in part based on information, including measurements, received from the mobile devices 320, 322, 324, 326, and/or 328. In various embodiments, the location of the mobile device may be determined based on signal information available to the network or to a mobile device.

As an example, the venue 302 may be a tradeshow attended by various attendees, such as executives, vendors, etc. Users A, B, C, D, and E may be attendees each carrying mobile devices 320, 322, 324, 326, and 328, respectively. The server 309 may track the location of mobile devices 320, 322, 324, 326, and 328 as Users A, B, C, D, and E travel through the tradeshow. The server 309 may establish two groups, one advertiser group related to pairing zone 319 and an executive group related to pairing zone 308. User A may travel into the pairing zone 319 to view an advertisement on the billboard 310. The server 309 may determine User A is located in the pairing zone 319, and may determine whether the time User A remains in the pairing zone 319 meets or exceeds a trigger time period associated with the pairing zone 319. User A may remain in the pairing zone 319 for 20 seconds which may exceed the trigger time period and server 309 may add mobile device 320 and/or User A to the advertising group associated with pairing zone 319. User A may travel to the small vendor area 306. At a later time, User B may travel to the pairing zone 319. The server 309 may determine User B is located in the pairing zone 319, and may determine whether the time User B remains in the pairing zone 319 meets or exceeds a trigger time period associated with the pairing zone 319. User B may remain in the pairing zone 319 for 25 seconds which may exceed the trigger time period and server 309 may add mobile device 322 and/or User B to the advertising group associated with pairing zone 319. In this manner, though User A and User B were not in the pairing zone 319 at the same time, the server 309 may add both Users A and B and/or their mobile devices 320 and 322 to the same group. Once added to the advertiser group, Users A and B and/or their mobile devices 320 and 322 may receive rewards, coupons, information, etc. from the advertiser who place the billboard 310 in the venue 302.

In a further example, User A may travel from the small vendor area 306 to the executive area 308. The server 309 may determine User A is located in the pairing zone 308 (i.e., the executive area 308), and may determine User A entering the executive area 308 from the small vendor area 306 indicates that User A crossed the geographic boundary between the small vendor area 306 and executive area 308. The server 309 may 308. User E may have been previously added to the executive group because User E's mobile device 328 was already identified as being in the pairing zone 308 associated with the executive group. Users C and D may not be added to the executive group because the server 309 may determine their mobile devices 324 and 326, respectively, did not enter the executive area 308. Once added to the executive group, Users A and E and/or their mobile devices 320 and 328 may receive rewards, coupons, information, etc. intended only for executives. In an embodiment, the executive group members may also be presented with a location challenge, such as a location challenge offering them a discount on small vendor services should they visit the small vendor area 306. The server 309 may determine the User A has completed the location challenge because mobile device 320 was present in the small vendor area 306 and may send a reward, such as a discount, to User A and/or mobile device 320.

Figure 4:
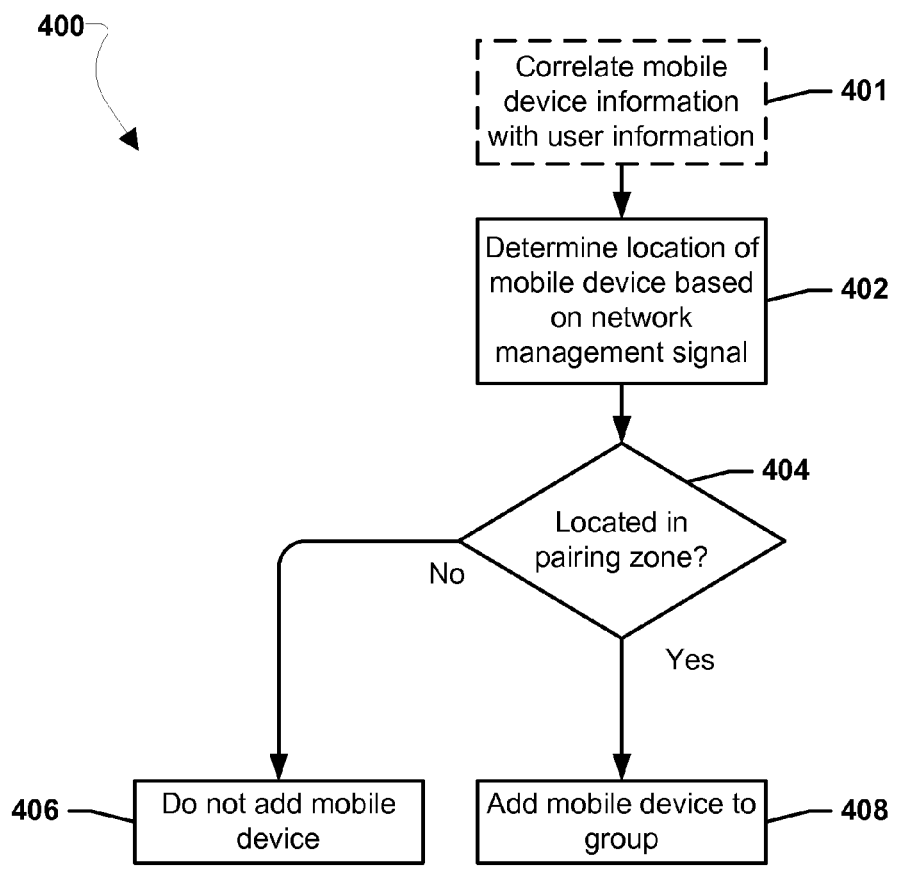
FIG. 4 is a process flow diagram illustrating an embodiment method for creating a group.

FIG. 4 illustrates an embodiment method 400 for creating and/or adding a mobile device to a group. In an embodiment, the operations of method 400 may be performed by a server in a wireless network, such as a Wi-Fi® network. In an optional embodiment, in optional block 401 the server may correlate mobile device information with user information. As an example, the server may receive a user registration including user information, such as name, address, photo, etc., from a mobile device and may associate the MAC ID and/or IP address of the device with the user information. In block 402 the server may determine the location of the mobile device based on network interactions with the mobile device, such as a network management signal received from the mobile device. In an embodiment, the server may determine the location of the mobile device by determining one or more access points (e.g., Wi-Fi® access points, Wi-Fi® beacons, Wi-Fi® transceivers, Wi-Fi® routers, etc.) to which the mobile device is available at a given time based on network management signals, such as probe requests or other queries sent by the mobile device and comparing coverage maps for the one or more access points to identify the location (e.g., longitude, latitude, and/or elevation) of the mobile device. Various methods for location determination may be used by the server, such as trilateration. Methods for determining location in the server are discussed further below with reference to FIG. 10. In determination block 404 the server may determine whether the mobile device is located in a pairing zone. In an embodiment, the server may determine the mobile device is located in a pairing zone by comparing the determined location of the mobile device to predefined coordinates of a pairing zone stored in a memory available to the server. A pairing zone may be of any shape, such as a circle of a radius from a predetermined point, a room, a triangle, a trapezoid, etc. If the server determines the mobile device is not in the pairing zone (i.e., determination block 404="No"), in block 406 the server may not add the mobile device to a group. If the server determines the mobile device is in the pairing zone (i.e., determination block 404="Yes"), in block 408 the server may add the mobile device to a group. In an embodiment, the group may be an already established group defined in a memory of available to the server. In another embodiment, adding the mobile device to a group may include creating a group when a group is not already established.

Figure 5:
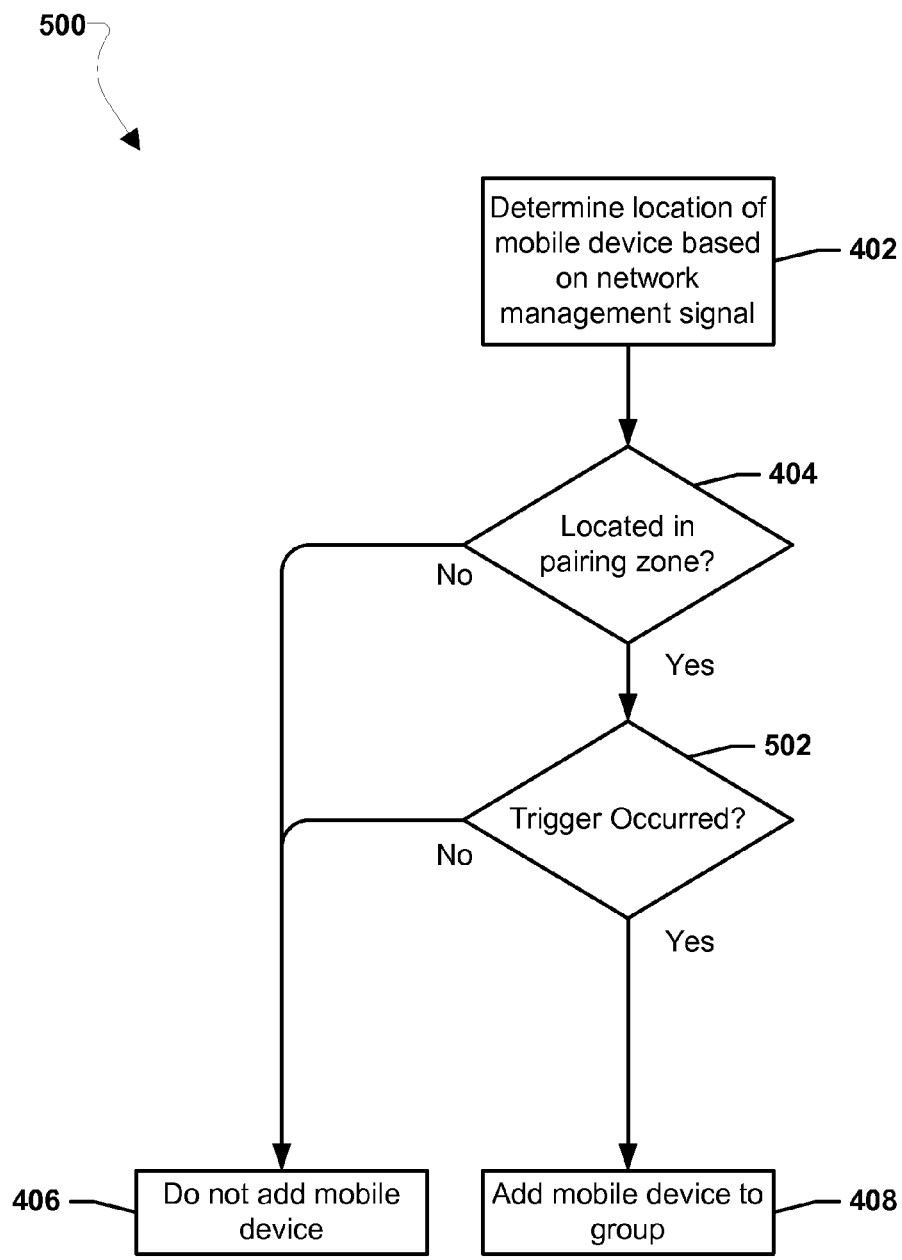
FIG. 5 is a process flow diagram illustrating an embodiment method for adding a mobile device to a group based on the occurrence of a trigger event.

FIG. 5 illustrates an embodiment method 500 similar to method 400 described above with reference to FIG. 4, except that in method 500 the mobile device may not be added to a group unless a trigger has occurred. In an embodiment, the operations of method 500 may be performed by a server in a wireless network, such as a Wi-Fi® network. In block 402, 404, and 406 the server may perform operations of like numbered blocks of method 400 described above with reference to FIG. 4. If the server determines the mobile device is located in the pairing zone (i.e., determination block 404="Yes"), in determination block 502 the server may determine whether a trigger has occurred. In an embodiment, a trigger may be a time period, crossing of a geographic boundary, providing of information, and/or other environmental factor. As an example, a trigger may be a minimum time period, such as 10 seconds, for which a mobile device must remain in a pairing zone to be added to a group. As an example, geographic boundary may be a line over which a mobile device must have crossed to be added to a group. As an example, information may be information sent from the mobile device, such as a user registration, HTTP GET request, etc. As another example, an environmental factor may the mobile device being present in the pairing zone at a certain time, such as between 1:00 PM and 1:30 PM. As a further example, an environmental factor may be the mobile device being in the pairing zone at the same time as another individual and/or mobile device. If the server determines the trigger did not occur (i.e., determination block 502="No"), as discussed above, in block 406 the server may not add the mobile device to the group. If the server determines the trigger did occur (i.e., determination block 502="Yes"), as discussed above, in block 408 the server may add the mobile device to the group.

Figure 6:
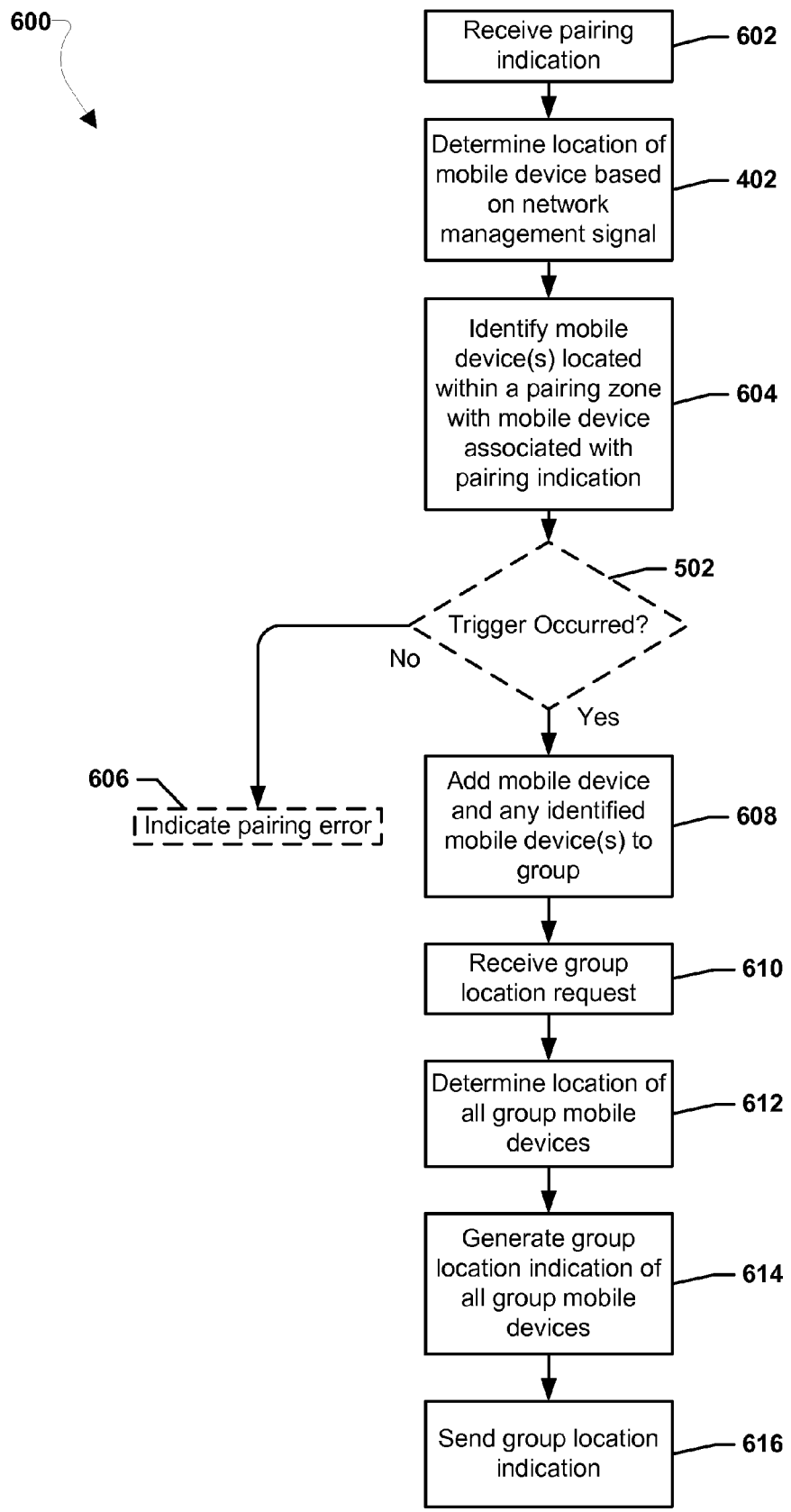
FIG. 6 is a process flow diagram illustrating an embodiment method for adding mobile devices identified within a pairing zone to a group.

FIG. 6 illustrates an embodiment method 600 for adding mobile devices identified within a pairing zone to a group. In an embodiment, the operations of method 600 may be performed by a server in a wireless network, such as a Wi-Fi® network. In block 602 the server may receive a pairing indication. In an embodiment, a pairing indication may be an indication to pair a given mobile device with other mobile devices in a group. As an example, a pairing indication may be an HTTP GET request from a mobile device in a pairing zone corresponding to a group creation page hosted by the server. As discussed above in block 402 the server may determine the location of the mobile device based on a network management signal from the mobile device. In a further embodiment, a pairing indication may include information, such a group name. In block 604 the server may identify one or more other mobile devices located in the pairing zone with the mobile device associated with the pairing indication. In an embodiment, the pairing zone may be a predefined geographic location, such as a circle defined at an amusement park entrance, in which mobile devices must be located to be paired. In another embodiment, a pairing zone may be a radius around the mobile device associated with the pairing indication and the geographic location may vary for each pairing indication received by the server. In this manner, pairing zones may be created by the server in any geographic location and of any size. In an embodiment, the server may determine the location of each other mobile device and may use the location determinations to identify whether the other mobile devices are within the pairing zone. As discussed above, in an optional embodiment, in block 502 the server may determine whether a trigger event has occurred. If the trigger has not occurred (i.e., determination block 502="No"), in block 606 the server may indicate a pairing error the mobile device associated with the pairing indication and/or the other mobile devices. If the trigger has occurred (i.e., determination block 502="Yes"), in block 608 the server may add the mobile device and any identified mobile devices to a group. In an embodiment, a group may be created for the mobile devices when the group does not already exist, and the mobile devices may be added to the newly created group. In an embodiment, the group may be named and/or other properties of the group controlled based at least in part on information in the pairing indication. In an embodiment, adding the mobile device and any identified mobile devices to the group may include generating a data table listing the MAC IDs and/or IP addresses of the mobile devices in a memory available to the server.

In block 610, the server may receive a group location request. In an embodiment, a group location request may be an HTTP GET request for content associated with a venue and/or the group. As an example, a group location request may be a request for a map of an amusement park the group members may be visiting. In block 612 the server may determine the location of all group members. As an example, the server may determine the location of all group members based on trilateration based on communications between the various group member mobile devices and access points (e.g., Wi-Fi® access points, Wi-Fi® beacons, Wi-Fi® transceivers, Wi-Fi® routers, etc.) throughout a wireless network (e.g., Wi-Fi® network). In block 614 the server may generate a group location indication of all group member mobile devices. In an embodiment, the group location indication may be a modification to content to include the location information of each group member mobile device thereby creating contextual content. As an example, the location indication may be a map of an amusement park modified to show the current location of all group members. In block 616 the server may send the group indication to one or more mobile devices of the group.

Figure 7:
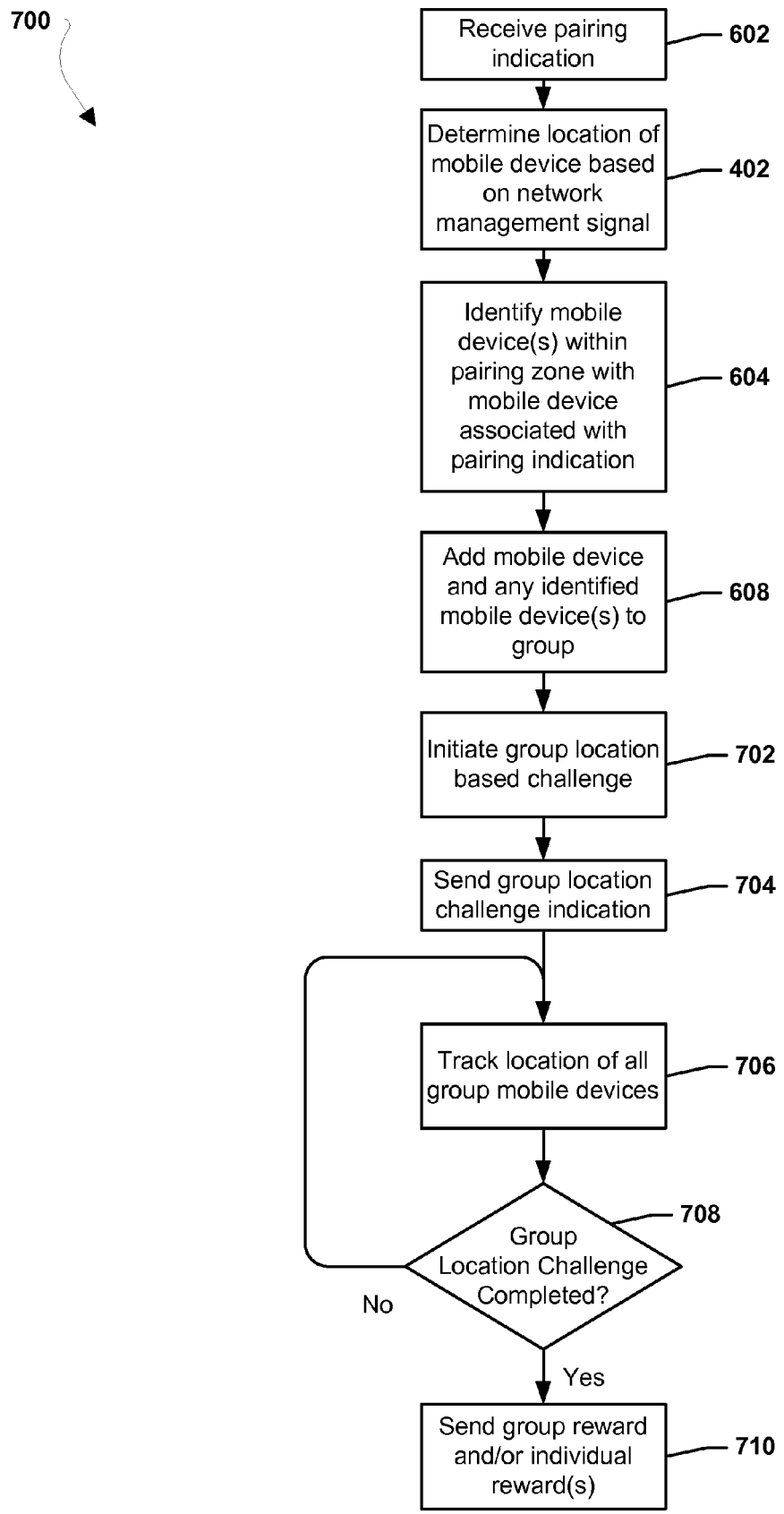
FIG. 7 is a process flow diagram illustrating an embodiment method for sending a group reward based on the completion of a group location challenge.

FIG. 7 illustrates an embodiment method 700 for sending a group reward based on the completion of a group location challenge. The operations of method 700 may be performed in conjunction with the operations of methods 400, 500, and/or 600 described above. In an embodiment, the operations of method 700 may be performed by a server in a wireless network, such as a Wi-Fi® network. In blocks 602, 402, 604, and 608 the server may perform operations of like numbered blocks of method 600 described above with reference to FIG. 6. In block 702 the server may initiate a group location based challenge. A group location based challenge may be a scavenger hunt type game, in which the group members are challenged to visit one or more locations in return for a reward for all members or the group and/or a winning portion of the group members. As an example, a group location based challenge may be provide reward points or prize points for visiting different areas of an amusement park, convention, tradeshow, etc. As another example, a group location based challenge may provide coupons to the group if all members visit a certain booth or advertisement. In block 704 the server may send the group location challenge indication to the group members. As an example, the server may send the indication as a banner displayed within content rendered by the mobile device, as an email, text message, pop-up add, etc. In block 706 the server may track the location of all group members. In determination block 708 the server may determine whether the group location challenge has been completed. If server determines the challenge has not been completed (i.e., determination block 708="No"), in block 706 the server may continue to track the location all group member mobile devices. If server determines the group location challenge is completed (i.e., determination block 708="Yes"), in block 710 the server may send the group reward and/or individual reward. In this manner rewards may be provided to individuals and/or groups based on group location challenge completion. As examples, rewards may include coupons, discounts, tokens, badges, advertisements, information, further challenges, tickets, prizes, points, etc.

Figure 8:
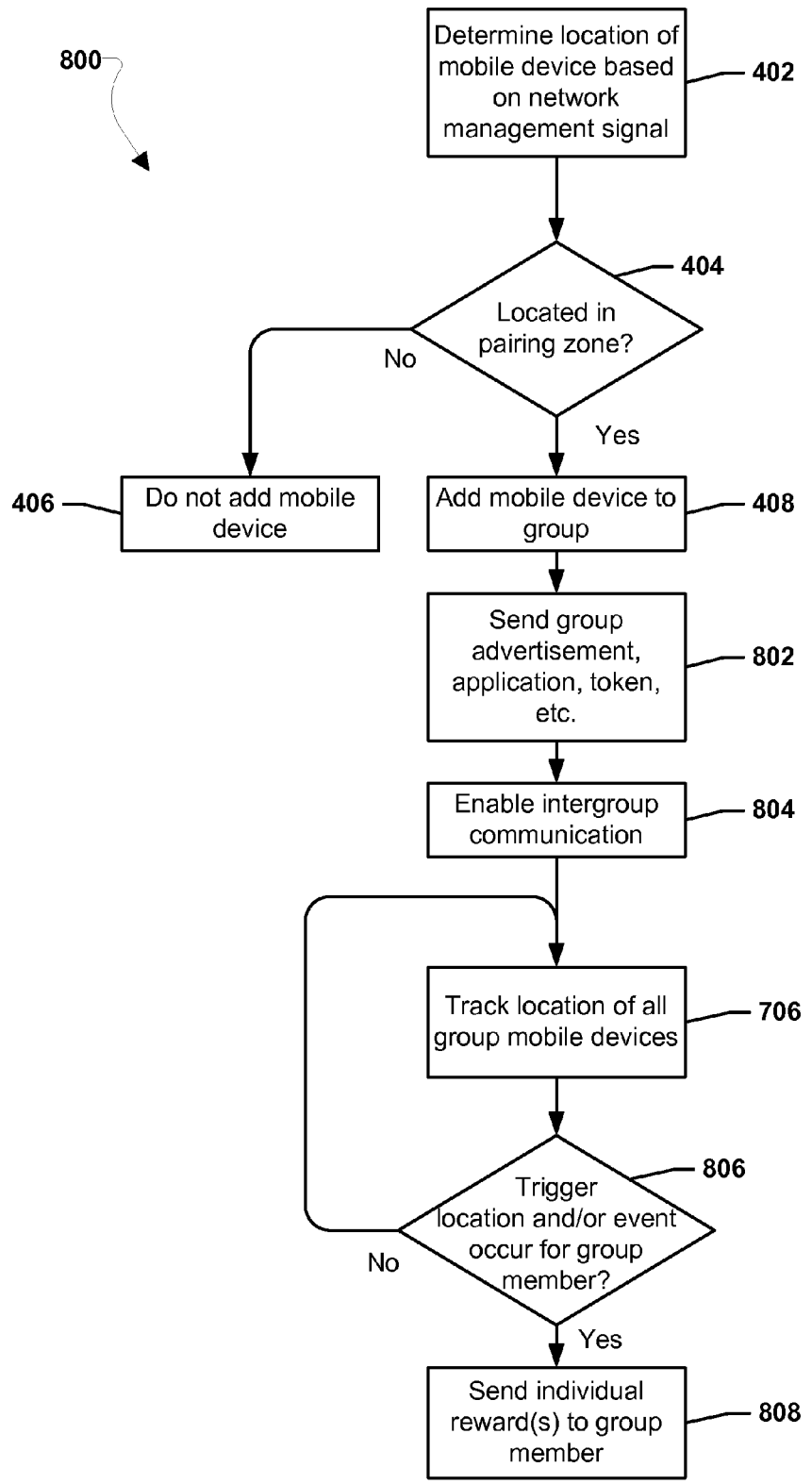
FIG. 8 is a process flow diagram illustrating an embodiment method for sending individual rewards to group members based on trigger locations and/or events.

FIG. 8 illustrates an embodiment method 800 for sending individual rewards to group members based on trigger locations and/or events. The operations of method 800 may be performed in conjunction with the operations of methods 400, 500, 600, and/or 700 described above. In an embodiment, the operations of method 800 may be performed by a server in a wireless network, such as a Wi-Fi® network. In blocks 402, 404, 406, and 408 the server may perform operations of like numbered blocks of FIG. 400 described above with reference to FIG. 4. In block 802 the server may send a group advertisement, application, token, etc. to one or more mobile device in the group. As an example, the server may provide a coupon to the mobile device merely for joining a group. In block 804 the server may enable intergroup communication between the mobile devices in the group. In an embodiment, group communication may be enabled by providing web based instant messaging functions, email capability, streaming text feeds, message boards, photo sharing, file sharing, etc. As discussed above in block 706 the server may track the location of all the group mobile devices. In determination block 806 the server may determine whether a trigger location and/or event occurred for a group member. As an example, the server may determine whether an individual group member entered a specific area and/or sent specific information to the server. If server determines the trigger did not occur (i.e., determination block 806="No"), in block 706 the server may continue to track the location of all group mobile devices. If the server determines the trigger did occur (i.e., determination block 806="Yes"), in block 808 the server may send the individual reward(s) to the group member. As examples, individual rewards may include coupons, discounts, tokens, badges, advertisements, information, further challenges, tickets, prizes, points, etc. sent to one member of the group.

Figure 9:
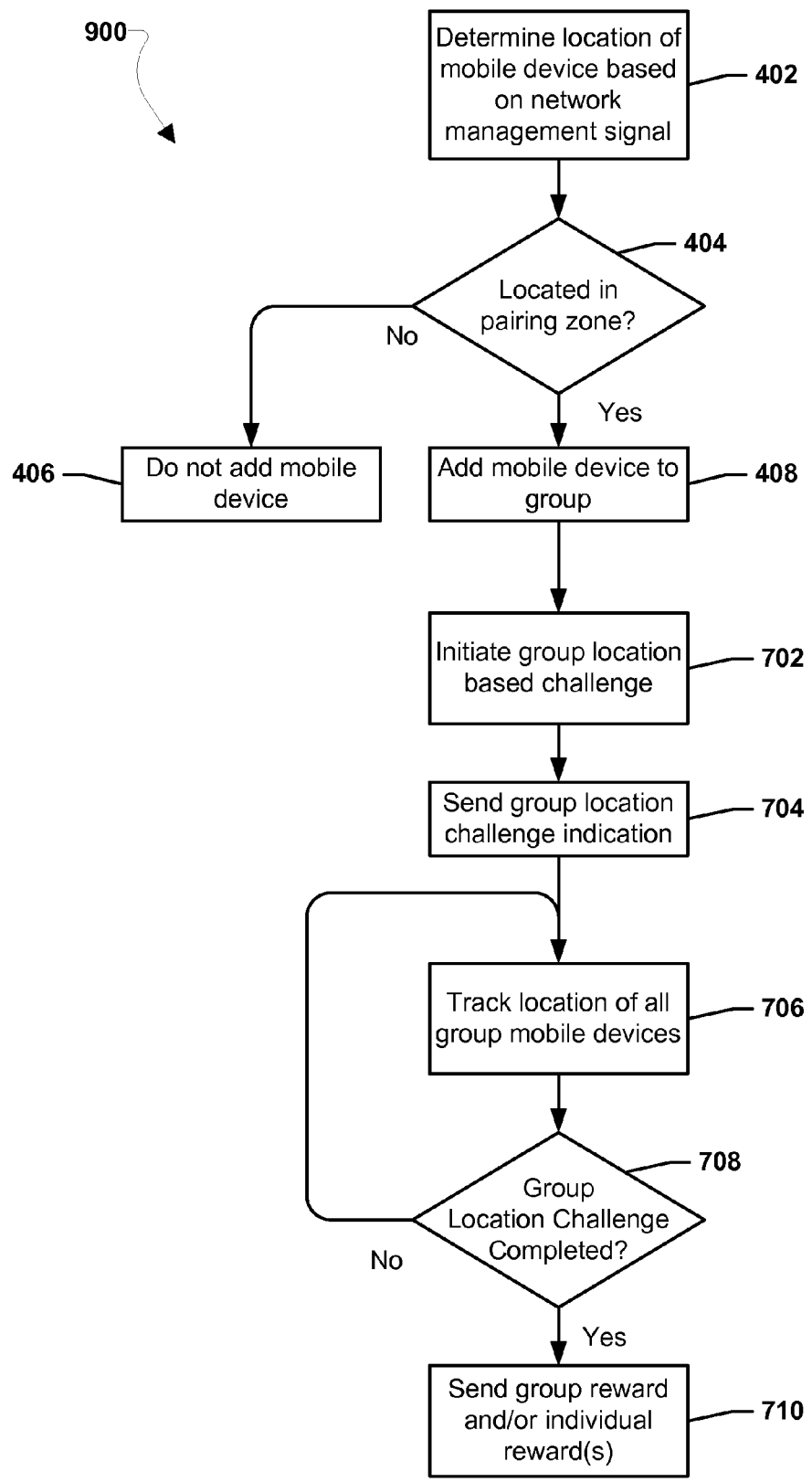
FIG. 9 is a process flow diagram illustrating another embodiment method for sending a group reward based on the completion of a group location challenge.

FIG. 9 illustrates an embodiment method 900 for sending a group reward based on the completion of a group location challenge. The operations of method 900 may be performed in conjunction with the operations of methods 400, 500, 600, 700, and/or 800 described above. In an embodiment, the operations of method 900 may be performed by a server in a wireless network, such as a Wi-Fi® network. As discussed above, in block 402 the server may determine the location of the mobile device based on a network management signal, and in determination block 404 may determine whether the mobile device may be located in the pairing zone. If the server determines the mobile device is not in the pairing zone (i.e., determination block 404="No"), as discussed above, in block 406 the server may not add the mobile device to a group. If the server determines the mobile device is located in the pairing zone (i.e., determination block 404="Yes"), as discussed above, in block 408 the server may add the mobile device to a group. As discussed above in block 702 the server may initiate a group location based challenge. As discussed above, in block 704 the server may send a group location challenge indication, and in block 706 may track the location of all group mobile devices. As discussed above, in determination block 708 the server may determine whether the group location challenge is completed. If the server determines the challenge is not completed (i.e., determination block 708="No"), in block 706 the server may continue to track the location of all group mobile devices. If the server determines the challenge is completed (i.e., determination block 710="Yes"), as discussed above, in block 710 the server may send the group reward and/or individual rewards.

Figure 10:
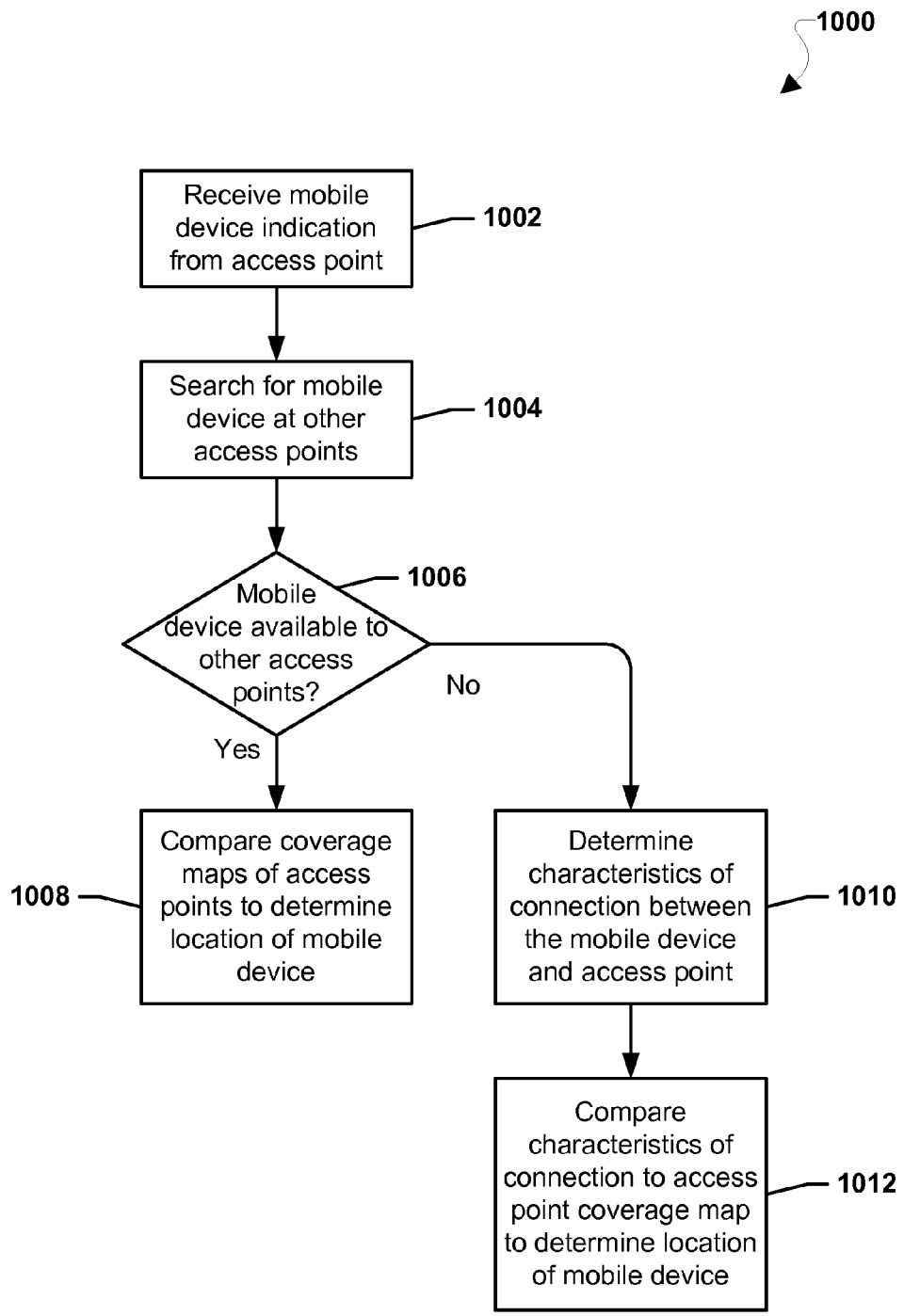
FIG. 10 is a process flow diagram illustrating an embodiment method for determining the location of a mobile device.

FIG. 10 illustrates an embodiment method 1000 for determining the location of a mobile device. The operations of method 1000 may be performed in conjunction with the operations of methods 400, 500, 600, 700, 800, and/or 900 described above. In an embodiment, the operations of method 1000 may be performed by a server in a wireless network, such as a Wi-Fi® network. In block 1002 the server may receive a mobile device indication from an access point. In an embodiment, a mobile device indication may be an indication that the mobile device has communicated with and/or connected with the access point. As an example, mobile device indication may be a MAC ID and/or IP address of a mobile device provided to an access point (e.g., Wi-Fi® access points, Wi-Fi® beacons, Wi-Fi® transceivers, Wi-Fi® routers, etc.) from the mobile device as part of a network management communication exchange between the access point and mobile device (e.g., a dynamic host configuration protocol ("DCHP") message exchange, Wi-Fi® message exchange, etc.). In block 1004 the server may search for the mobile device at other access points. As an example, the server may poll other access points to determine whether the other access points can establish communications with the mobile device. As another example, the server may compare the MAC ID and/or IP address of the mobile device to a list of MAC IDs and/or IP addresses for associated mobile devices for each access point to identify a match for the mobile device.

In determination block 1006 the server may determine whether the mobile device is available to other access points. As an example, the mobile device may be available to other access points when the other access points are in communication with the mobile device. If the server determines the mobile device is available to other access points (i.e., determination block 1006="Yes"), in block 1008 the server may compare the coverage maps of the access points to determine the location of the mobile device. In an embodiment, comparing the coverage maps of the access points to determine the location of the mobile device may include performing trilateration to identify the latitude, longitude, and/or elevation of the mobile device. If the server determines the mobile device is not available to other access points (i.e., determination block 1006="No"), in block 1010 the server may determine the characteristics of the connection between the mobile device and the access point. In an embodiment, connection characteristics may include quality of server, signal strength, and error rate measurements. In an embodiment, the connection characteristics may be determined based on information received from the mobile device at the access point provided to the server. In block 1012 the server may compare the characteristics of the connection to an access point coverage map to determine the location of the mobile device. In an embodiment, the coverage map may correlate the connection characteristics with location information (e.g., latitude, longitude, and/or elevation) of the geographic area covered by the signal from the access point.

Figure 11:
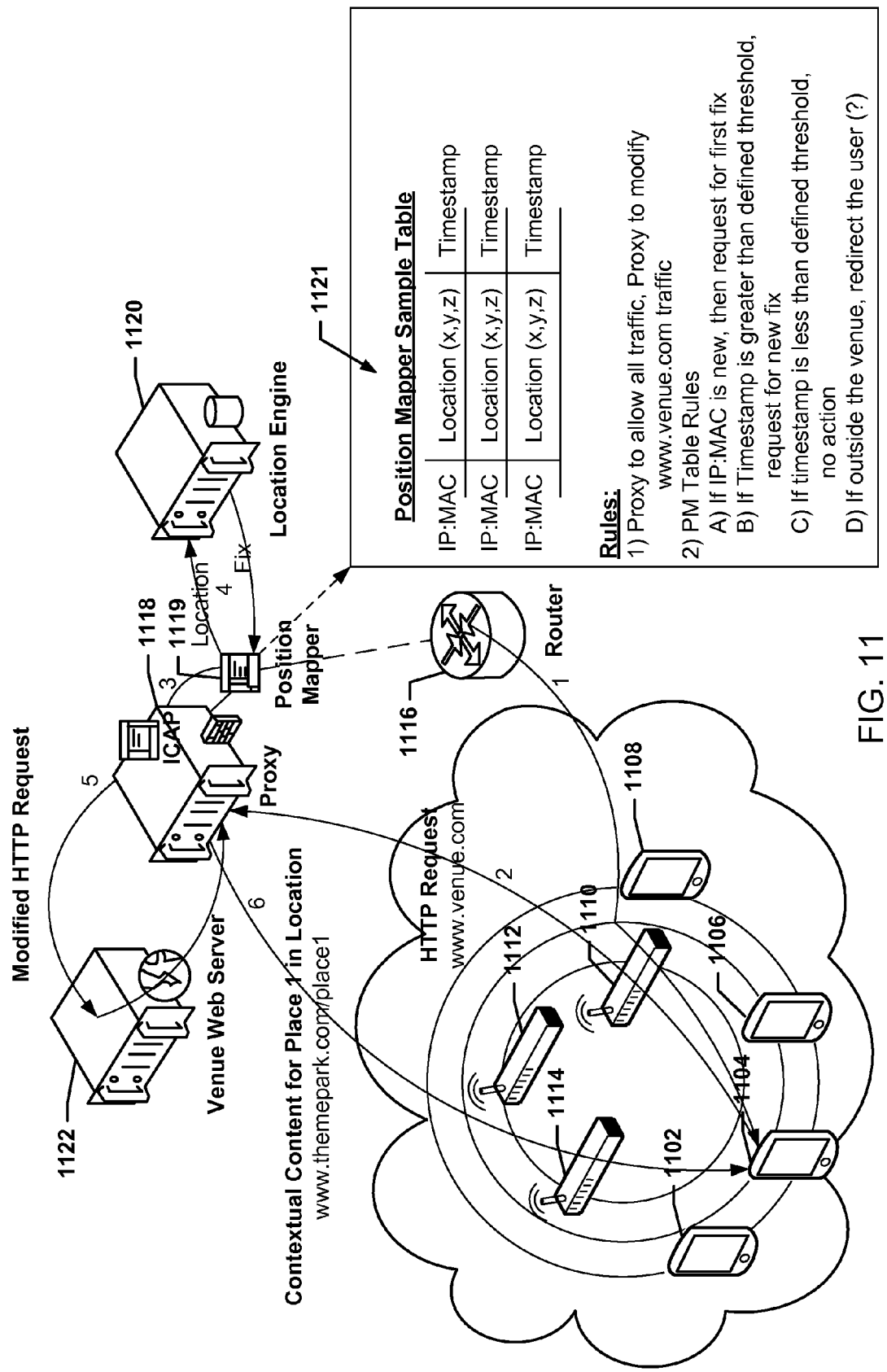
FIG. 11 is a system block diagram illustrating a system and message flows according to an embodiment.

FIG. 11 is a system block diagram illustrating a system and message flows according to an embodiment for establishing a group and providing contextual content to a group of mobile devices 1102, 1104, 1106, 1108. FIG. 11 illustrates an embodiment in which a contextual map of a venue (e.g., a theme park) showing the location of the mobile devices 1102, 1104, 1106, 1108 may be provided to the group. Initially, the mobile devices 1102, 1104, 1106, 1108 may be located in a pairing zone and be in communication with wireless communication routers (e.g., WiFi routers) 1110, 1112, and 1114, which in turn communicate with a network router 1116 and added to the same group based on being in the same location, i.e., the pairing zone. Upon pairing the group may be defined by the creation of a position mapper table 1121 for the mobile devices 1102, 1104, 1106, 1108 in the group in a memory available to a position mapper application 1119 running on a proxy server 1118. The IP address and MAC ID of each mobile device 1102, 1104, 1106, 1108 in the group may be added to the position mapper table 1121 and may be correlated with the last location x,y,z (e.g., longitude, latitude, and elevation) determined for the respective mobile device 1102, 1104, 1106, 1108 and a timestamp of when the location determination occurred. The location may be determined by a location engine 1120 which may provide location fixes to the position mapper application 1119. An example of a location engine 1120 that may be used is the IZat™ product marketed by Qualcomm, Inc. In an embodiment, the position mapper table 1121 may be governed by rules, such as if an IP address or MAC ID is new, a fix should be requested, if a timestamp is greater than a defined threshold, request a new fix, if a time stamp is less than a defined threshold take no action, and if the user is located outside the venue, redirect the user to another URL, etc. In this manner, the position mapper table 1121 may be continually updated with current location information for each mobile device 1102, 1104, 1106, 1108 in the group and the mobile devices 1102, 1104, 1106, 1108, in the group may be tracked.

A mobile device 1104 may send an HTTP GET request for a URL of a server 1122 associated with the venue (e.g., www.themepark.com) via a wireless access point 1110, 1112, and 1114. In an embodiment, the venue's URL may be associated with a map of the venue. The proxy server 1118 may receive the request from the mobile device 1104 via an access point 1110, 1112, and 1114 and the position mapper application 1119 may determine that the mobile device 1104 is part of a group defined in the position mapper table 1121 based on the IP address and/or MAC ID received in the HTTP GET request. The position mapper application 1119 may interface with the location engine 1120 to fix the location of all the group member mobile devices and may modify the HTTP GET request with location information for the group member mobile devices, for example changing the requested URL to a URL for the nearest place associated with a URL (e.g., www.themepark.com/place1). The proxy server 1118 may send the request to the venue server 1122 and receive the content associated with the modified URL. The proxy server 1118 may then modify the content to include location information for the group members, such as graphical representations of their location in the venue and provide the contextual content to the mobile device 1104 for display by a web browser of the mobile device 1104. In this manner, the mobile device 1104 may display the location of the group member mobile devices 1102, 1104, 1106, 1108 without requiring position determination capability on each mobile device 1102, 1104, 1106, 1108 or specific location applications to be downloaded to each mobile device.

Figure 12:
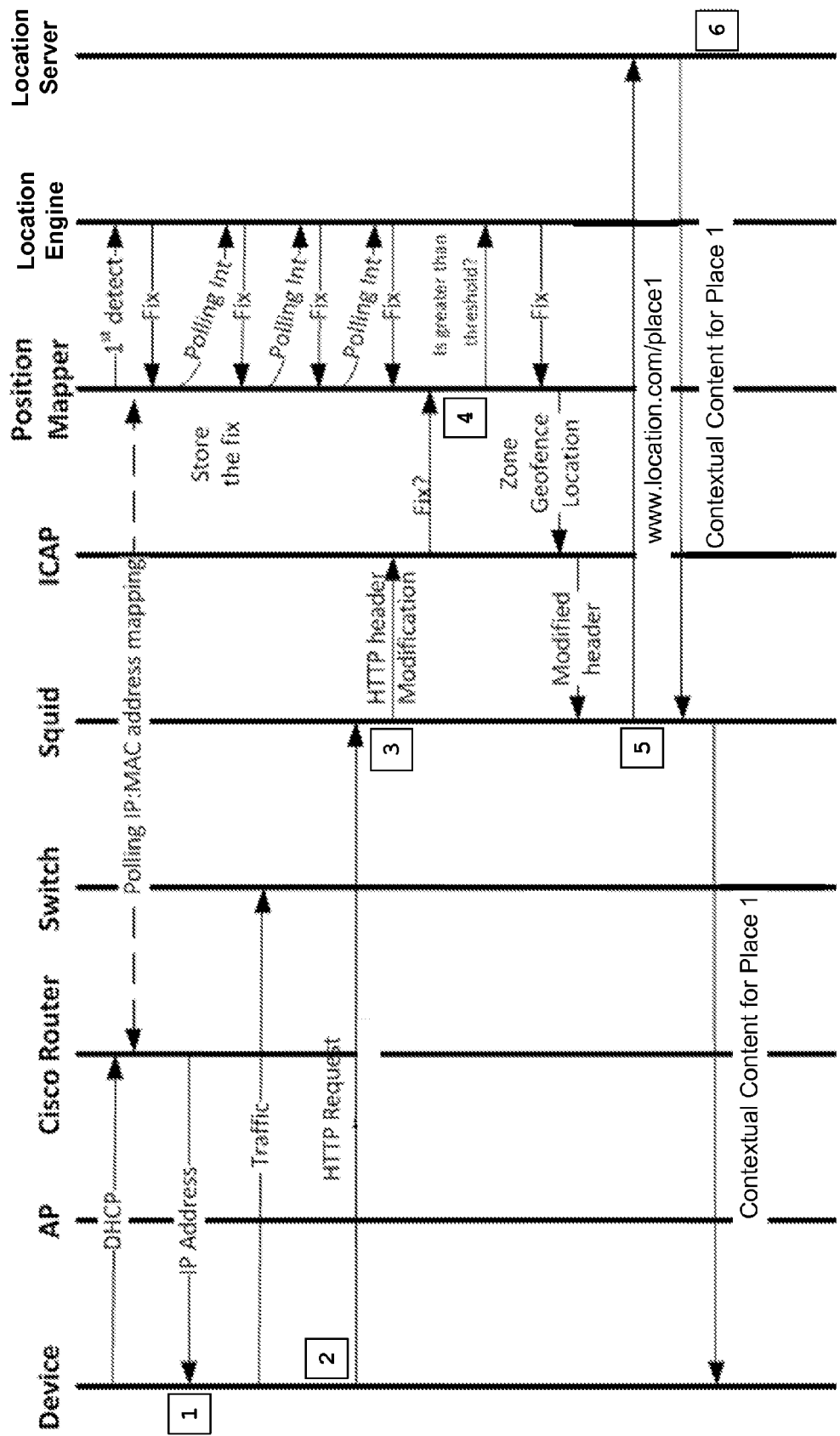
FIG. 12 is a message flow diagram illustrating example message flows in the embodiment system illustrated in FIG. 11.

FIG. 12 is a message flow diagram illustrating example message flows in the embodiment system illustrated in FIG. 11. Initially the mobile device 1104 may establish a connection with the router 1116. The router 1116 may assign an IP address to the mobile device 1104 and the router, switch, proxy server 1118, and position mapper application 1119 may map the IP address to a MAC ID. The position mapper application 1119 may continually poll the router 1116 and/or other access points to track and fix the location of the mobile device 1104 using the location engine 1120 (e.g., IZat™) and may update the position mapper table 1121 accordingly. The router 1116 may provide the IP address to the mobile device 1104. Non-venue related traffic may be handled according to standard protocols. A HTTP GET request related to the URL of the venue server 1122 (e.g., www.themepark.com) may be identified by the proxy server 1118 for special handling, and based on the current fix, or a new fix if the current fix is aged out, the current location of one or more group member mobile devices may be provided from the position mapper application 1119 and the HTTP GET Request header information may be modified (e.g., by an Internet Content Adaption Protocol ("ICAP") type program) at the proxy server 1118 to modify the URL to a URL associated with the location of the mobile device (e.g., www.themepark.com/place1) as discussed above. The venue web server 1122 may return the contextual content associated with the URL, the proxy server may modify the contextual content, and the contextual content may be provided back through the venue's network to the mobile device 1104.

Figure 13:
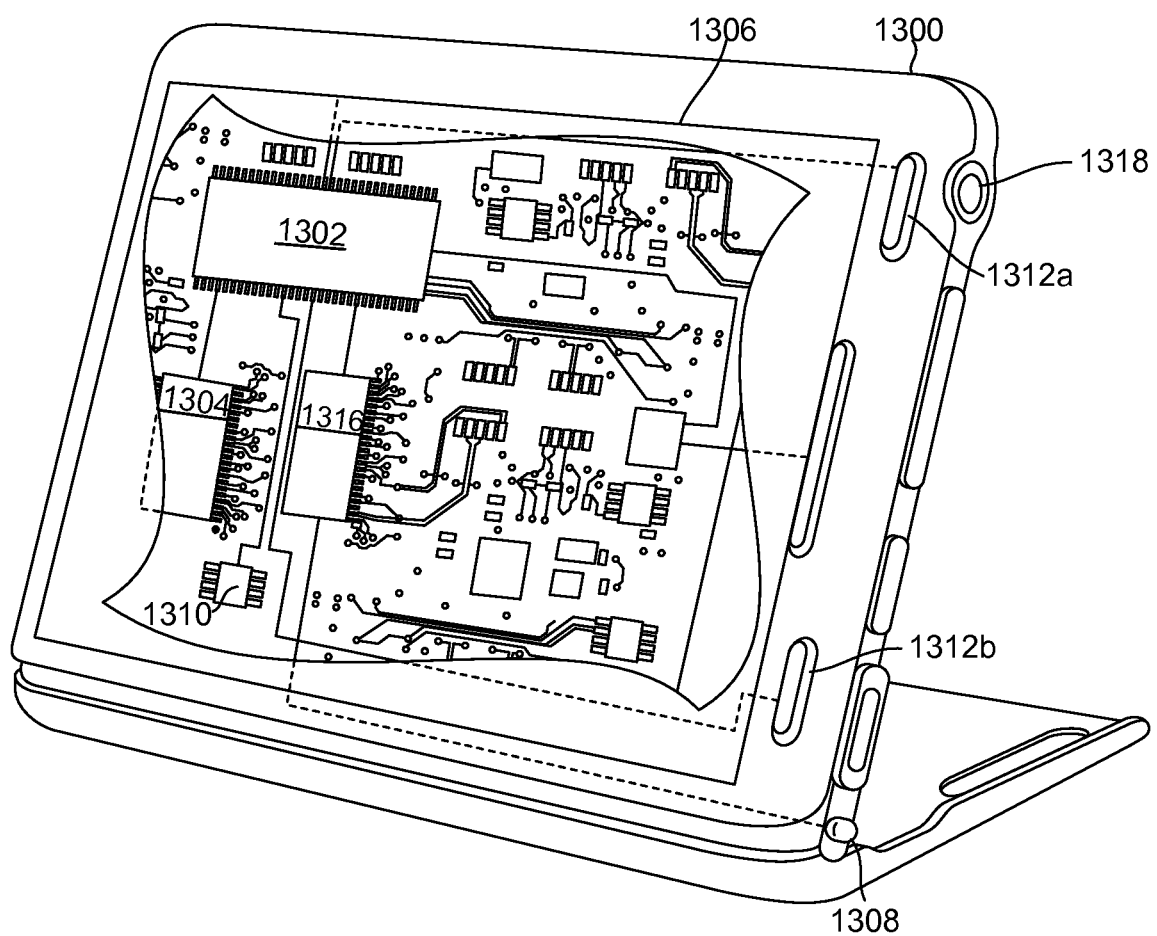
FIG. 13 is a component diagram of an example mobile device suitable for use with the various embodiments.

The various embodiments may be implemented in any of a variety of mobile devices, an example of which is illustrated in FIG. 13. For example, the mobile device 1300 may include a processor 1302 coupled to internal memories 1304 and 1310. Internal memories 1304 and 1310 may be volatile or non-volatile memories, and may also be secure and/or encrypted memories, or unsecure and/or unencrypted memories, or any combination thereof. The processor 1302 may also be coupled to a touch screen display 1306, such as a resistive-sensing touch screen, capacitive-sensing touch screen infrared sensing touch screen, or the like. Additionally, the display of the mobile device 1300 need not have touch screen capability. Additionally, the mobile device 1300 may have one or more antenna 1308 for sending and receiving electromagnetic radiation that may be connected to a wireless data link (e.g., Wi-Fi®, Bluetooth®, or any other type data link) and/or cellular telephone transceiver 1316 coupled to the processor 1302 for establishing network interface connections with a network, such as a local area network including wireless access points (e.g., Wi-Fi® access points) coupled to other system computers and servers, the Internet, the public switched telephone network, and/or a cellular network (e.g., CDMA, TDMA, GSM, PCS, 3G, 4G, LTE, or any other type of cellular network). The mobile device 1300 may also include physical buttons 1312a and 1312b for receiving user inputs. The mobile device 1300 may also include a power button 1318 for turning the mobile device 1300 on and off.

Figure 14:
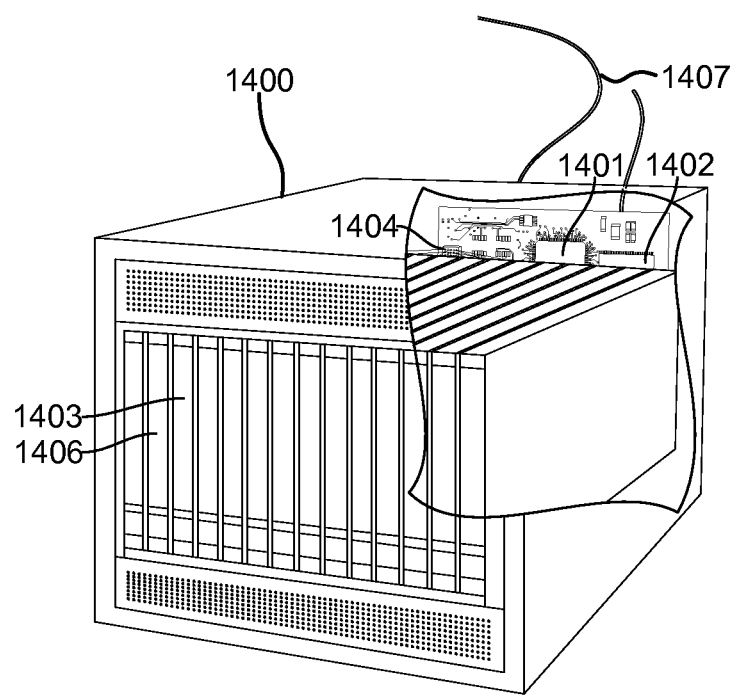
FIG. 14 is a component diagram of an example server suitable for use with the various embodiments.

The various embodiments may also be implemented on any of a variety of commercially available server devices, such as the server 1400 illustrated in FIG. 14. Such a server 1400 typically includes a processor 1401 coupled to volatile memory 1402 and a large capacity nonvolatile memory, such as a disk drive 1403. The server 1400 may also include a floppy disc drive, compact disc (CD) or DVD disc drive 1406 coupled to the processor 1401. The server 1400 may also include network access ports 1404 coupled to the processor 1401 for establishing network interface connections with a network 1407, such as a local area network including wireless access points (e.g., Wi-Fi® access points) coupled to other system computers and servers, the Internet, the public switched telephone network, and/or a cellular network (e.g., CDMA, TDMA, GSM, PCS, 3G, 4G, LTE, or any other type of cellular network).

The processors 1302 and 1401 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1304, 1310, 1402, and 1403 before they are accessed and loaded into the processors 1302 and 1401. The processors 1302 and 1401 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1302 and 1401 including internal memory or removable memory plugged into the device and memory within the processor 1302 and 1401 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium, non-transitory processor-readable medium, or non-transitory server readable medium. The steps of a method or algorithm disclosed herein may be embodied in a processor-executable and/or server-executable software module which may reside on a non-transitory computer-readable, non-transitory processor-readable medium, or non-transitory server readable medium. Non-transitory computer-readable media, non-transitory processor-readable media, or non-transitory server readable media may be any storage media that may be accessed by a computer, processor, or a server. By way of example but not limitation, such non-transitory computer-readable, processor-readable, or server-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable, processor-readable, and server-readable media. Additionally, the operations of a method or algorithm may reside as one or any combination or set of codes and/or instructions on a non-transitory server-readable medium, processor-readable medium, and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for creating a group, comprising:
    determining, in a server, a location of a mobile device based on a network management signal received from the mobile device, wherein the network management signal establishes a wireless communication link between the mobile device and one or more Wi-Fi access points connected to the server and wherein determining, in the server, the location of the mobile device based on the network management signal received from the mobile device comprises:
        determining, in the server, the one or more Wi-Fi access points to which the mobile device is available at a time based on the network management signal received from the mobile device; and
        comparing, in the server, coverage maps for the determined one or more Wi-Fi access points to determine the location of the mobile device;
    determining, in the server, whether the mobile device is located in a pairing zone based on the determined location of the mobile device; and
    adding the mobile device to the group maintained by the server upon determining the mobile device is located in the pairing zone.

2. The method of claim 1, wherein:
    the one or more Wi-Fi access points comprise at least three Wi-Fi access points; and
    comparing, in the server, coverage maps for the determined one or more Wi-Fi access points to determine the location of the mobile device comprises performing trilateration in the server based at least in part on the coverage maps of the determined at least three Wi-Fi access points to determine the location of the mobile device.

3. The method of claim 1, wherein determining, in the server, the location of the mobile device based on the network management signal received from the mobile device further comprises:
    determining characteristics of connections between the determined one or more Wi-Fi access points and the mobile device at the time; and
    comparing, in the server, the determined characteristics of connections between the determined one or more Wi-Fi access points and coverage maps for the determined one or more Wi-Fi access points to determine the location of the mobile device.

4. The method of claim 3, wherein the characteristics of connections are one or more of quality of service, signal strength, and error rate.

5. The method of claim 1, wherein determining, in the server, a location of the mobile device based on the network management signal received from the mobile device further comprises:
    estimating separation distances between the mobile device and each of three or more Wi-Fi access points based on measured signal characteristics; and
    estimating the location of the mobile device using the estimated separation distances and known locations of the three or more Wi-Fi access points using a trilateration algorithm.

6. The method of claim 5, wherein the signal characteristics are one or more of quality of service, signal strength, and error rate.

7. The method of claim 1, further comprising:
    determining, in the server, whether a trigger has occurred, wherein adding the mobile device to the group maintained by the server upon determining the mobile device is located in the pairing zone comprises adding the mobile device to the group maintained by the server upon determining that the mobile device is located in the pairing zone and the trigger has occurred.

8. The method of claim 7, wherein the trigger is an expiration of a time period or a mobile device context.

9. The method of claim 1, further comprising correlating the mobile device with user information in the server.

10. The method of claim 1, further comprising enabling group communications between the mobile device and any other mobile device that is a member of the group upon adding the mobile device to the group in the server.

11. The method of claim 1, further comprising:
tracking locations of all group member mobile devices;
determining, in the server, whether the mobile device enters a trigger location and a trigger event occurs; and
sending a reward to the mobile device upon the mobile device entering the trigger location and the trigger event occurring.

12. The method of claim 11, wherein the reward is one or more of a coupon, discount, application, token, and advertisement.

13. The method of claim 1, further comprising:
initiating a group location based challenge;
sending a group location challenge indication to all group member mobile devices;
tracking locations of all group member mobile devices in the server;
determining, in the server, whether the group location challenge is completed; and
sending a reward to all group member mobile devices upon completion of the group location challenge.

14. The method of claim 13, wherein the reward is one or more of a coupon, discount, application, token, and advertisement.

15. The method of claim 1, further comprising:
receiving a group location request in the server;
determining a current location of all group member mobile devices; and
generating a group location indication of determined current locations of all group member mobile devices.

16. The method of claim 15, wherein the group location indication is a map illustrating the determined current locations of all group member mobile devices.

17. The method of claim 1, further comprising correlating, in the server, user information of all mobile devices that are members of the group.

18. The method of claim 1, wherein at least a portion of the operations of the method are performed as post event data analysis.

19. The method of claim 1, wherein the network management signal is an access point probe request.

20. The method of claim 1, further comprising:
tracking the location of all group member mobile devices in the server to generate a database of location history information; and
performing analytics on the database of location history information based on the group.

21. A server, comprising:
means for determining a location of a mobile device based on a network management signal received from the mobile device, wherein the network management signal establishes a wireless communication link between the mobile device and one or more Wi-Fi access points connected to the server and wherein means for determining the location of the mobile device based on the network management signal received from the mobile device comprises:
means for determining the one or more Wi-Fi access points to which the mobile device is available at a time based on the network management signal received from the mobile device; and
means for comparing coverage maps for the determined one or more Wi-Fi access points to determine the location of the mobile device;
means for determining whether the mobile device is located in a pairing zone based on the determined location; and
means for adding the mobile device to a group upon determining the mobile device is located in the pairing zone.

22. The server of claim 21, wherein:
the one or more Wi-Fi access points comprise at least three Wi-Fi access points; and
means for comparing coverage maps for the determined one or more Wi-Fi access points to determine the location of the mobile device comprises means for performing trilateration based at least in part on the coverage maps of the determined at least three Wi-Fi access points to determine the location of the mobile device.

23. The server of claim 21, wherein means for determining the location of the mobile device based on a network management signal received from the mobile device further comprises:
means for determining characteristics of connections between the determined one or more Wi-Fi access points and the mobile device at the time; and
means for comparing in the server the determined characteristics of connections between the determined one or more Wi-Fi access points and coverage maps for the determined one or more Wi-Fi access points to determine the location of the mobile device.

24. The server of claim 23, wherein the characteristics of connections are one or more of quality of service, signal strength, and error rate.

25. The server of claim 21, wherein means for determining the location of the mobile device based on a network management signal received from the mobile device further comprises:
means for estimating separation distances between the mobile device and each of three or more Wi-Fi access points based on measured signal characteristics; and
means for estimating the location of the mobile device using the estimated separation distances and known locations of the three or more Wi-Fi access points using a trilateration algorithm.

26. The server of claim 25, wherein the signal characteristics are one or more of quality of service, signal strength, and error rate.

27. The server of claim 21, further comprising:
means for determining whether a trigger has occurred,
wherein means for adding the mobile device to the group upon determining the mobile device is located in the pairing zone comprises means for adding the mobile device to the group upon determining that the mobile device is located in the pairing zone and the trigger has occurred.

28. The server of claim 27, wherein the trigger is an expiration of a time period or a mobile device context.

29. The server of claim 21, further comprising means for correlating the mobile device with user information.

30. The server of claim 21, further comprising means for enabling group communications between the mobile device and any other mobile device that is a member of the group upon adding the mobile device to the group.

31. The server of claim 21, further comprising:
means for tracking locations of all group member mobile devices;
means for determining whether the mobile device enters a trigger location and a trigger event occurs; and means for sending a reward to the mobile device upon the mobile device entering the trigger location and the trigger event occurring.

32. The server of claim 31, wherein the reward is one or more of a coupon, discount, application, token, and advertisement.

33. The server of claim 21, further comprising:
means for initiating a group location based challenge;
means for sending a group location challenge indication to all group member mobile devices;
means for tracking locations of all group member mobile devices;
means for determining whether the group location challenge is completed; and
means for sending a reward to all group member mobile devices upon completion of the group location challenge.

34. The server of claim 33, wherein the reward is one or more of a coupon, discount, application, token, and advertisement.

35. The server of claim 21, further comprising:
means for receiving a group location request;
means for determining a current location of all group member mobile devices; and
means for generating a group location indication of determined current locations of all group member mobile devices.

36. The server of claim 35, wherein the group location indication is a map illustrating the determined current locations of all group member mobile devices.

37. The server of claim 21, further comprising means for correlating user information of all mobile devices that are members of the group.

38. The server of claim 21, wherein the server is configured such that at least a portion of the means operate during post event data analysis.

39. The server of claim 21, wherein the network management signal is an access point probe request.

40. The server of claim 21, further comprising:
means for tracking the location of all group member mobile devices to generate a database of location history information; and
means for performing analytics on the database of location history information based on the group.

41. A server, comprising:
a network interface configured to communicate with a network
a processor coupled to the network interface, wherein the processor is configured with processor-executable instructions to perform operations comprising:
determining a location of a mobile device based on a network management signal received from the mobile device via the network interface, wherein the network management signal establishes a wireless communication link between the mobile device and one or more Wi-Fi access points connected to the server and wherein determining the location of the mobile device based on the network management signal received from the mobile device comprises:
determining the one or more Wi-Fi access points to which the mobile device is available at a time based on the network management signal received from the mobile device; and
comparing coverage maps for the determined one or more Wi-Fi access points to determine the location of the mobile device;
determining whether the mobile device is located in a pairing zone based on the determined location; and
adding the mobile device to a group upon determining the mobile device is located in the pairing zone.

42. The server of claim 41, wherein the processor is configured with processor-executable instructions to perform operations such that:
the one or more Wi-Fi access points comprise at least three Wi-Fi access points; and
comparing coverage maps for the determined one or more Wi-Fi access points to determine the location of the mobile device comprises performing trilateration based at least in part on the coverage maps of the determined at least three Wi-Fi access points to determine the location of the mobile device.

43. The server of claim 41, wherein the processor is configured with processor-executable instructions to perform operations such that determining the location of the mobile device based on the network management signal received from the mobile device via the network interface comprises:
determining characteristics of connections between the determined one or more Wi-Fi access points and the mobile device at the time; and
comparing in the server the determined characteristics of connections between the determined one or more Wi-Fi access points and coverage maps for the determined one or more Wi-Fi access points to determine the location of the mobile device.

44. The server of claim 43, wherein the characteristics of connections are one or more of quality of service, signal strength, and error rate.

45. The server of claim 41, wherein the processor is configured with processor-executable instructions to perform operations such that determining the location of the mobile device based on the network management signal received from the mobile device via the network interface comprises:
estimating separation distances between the mobile device and each of three or more Wi-Fi access points based on measured signal characteristics; and
estimating the location of the mobile device using the estimated separation distances and known locations of the three or more Wi-Fi access points using a trilateration algorithm.

46. The server of claim 45, wherein the signal characteristics are one or more of quality of service, signal strength, and error rate.

47. The server of claim 41, wherein the processor is configured with processor-executable instructions to perform operations further comprising:
determining whether a trigger has occurred, and
wherein the processor is configured with processor-executable instructions to perform operations such that adding the mobile device to the group upon determining the mobile device is located in the pairing zone comprises adding the mobile device to the group upon determining that the mobile device is located in the pairing zone and the trigger has occurred.

48. The server of claim 47, wherein the trigger is an expiration of a time period or a mobile device context.

49. The server of claim 41, wherein the processor is configured with processor-executable instructions to perform operations further comprising correlating the mobile device with user information.

50. The server of claim 41, wherein the processor is configured with processor-executable instructions to perform operations further comprising enabling group communications between the mobile device and any other mobile device that is a member of the group upon adding the mobile device to the group.

51. The server of claim 41, wherein the processor is configured with processor-executable instructions to perform operations further comprising:
tracking locations of all group member mobile devices;
determining whether the mobile device enters a trigger location and a trigger event occurs; and
sending a reward to the mobile device upon the mobile device entering the trigger location and the trigger event occurring.

52. The server of claim 51, wherein the reward is one or more of a coupon, discount, application, token, and advertisement.

53. The server of claim 41, wherein the processor is configured with processor-executable instructions to perform operations further comprising:
initiating a group location based challenge;
sending a group location challenge indication to all group member mobile devices;
tracking locations of all group member mobile devices;
determining whether the group location challenge is completed; and
sending a reward to all group member mobile devices upon completion of the group location challenge.

54. The server of claim 53, wherein the reward is one or more of a coupon, discount, application, token, and advertisement.

55. The server of claim 41, wherein the processor is configured with processor-executable instructions to perform operations further comprising:
receiving a group location request via the network interface;
determining a current location of all group member mobile devices; and
generating a group location indication of determined current locations of all group member mobile devices.

56. The server of claim 55, wherein the group location indication is a map illustrating the determined current locations of all group member mobile devices.

57. The server of claim 41, wherein the processor is configured with processor-executable instructions to perform operations further comprising correlating user information of all mobile devices that are members of the group.

58. The server of claim 41, wherein the processor is configured with processor-executable instructions to perform operations such that at least a portion of the operations are performed during post event data analysis.

59. The server of claim 41, wherein the network management signal is an access point probe request.

60. The server of claim 41, wherein the processor is configured with processor-executable instructions to perform operations further comprising:
tracking the location of all group member mobile devices to generate a database of location history information; and
performing analytics on the database of location history information based on the group.

61. A non-transitory server readable medium having stored thereon server-executable instructions configured to cause a server to perform operations, comprising:
determining a location of a mobile device based on a network management signal received from the mobile device, wherein the network management signal establishes a wireless communication link between the mobile device and one or more Wi-Fi access points connected to the server and wherein determining the location of the mobile device based on the network management signal received from the mobile device comprises:
determining, in the server, the one or more Wi-Fi access points to which the mobile device is available at a time based on the network management signal received from the mobile device; and
comparing, in the server, coverage maps for the determined one or more Wi-Fi access points to determine the location of the mobile device;
determining whether the mobile device is located in a pairing zone based on the determined location; and
adding the mobile device to a group upon determining the mobile device is located in the pairing zone.

62. The non-transitory server readable medium of claim 61, wherein the stored server-executable instructions are configured to cause a server to perform operations such that: the one or more Wi-Fi access points comprise at least three Wi-Fi access points; and comparing coverage maps for the determined one or more Wi-Fi access points to determine the location of the mobile device comprises performing trilateration based at least in part on the coverage maps of the determined at least three Wi-Fi access points to determine the location of the mobile device.

63. The non-transitory server readable medium of claim 61, wherein the stored server-executable instructions are configured to cause a server to perform operations such that determining the location of the mobile device based on the network management signal received from the mobile device via the network interface further comprises:
determining characteristics of connections between the determined one or more wireless Wi-Fi access points and the mobile device at the time; and
comparing in the server the determined characteristics of connections between the determined one or more Wi-Fi access points and coverage maps for the determined one or more Wi-Fi access points to determine the location of the mobile device.

64. The non-transitory server readable medium of claim 63, wherein the stored server-executable instructions are configured to cause a server to perform operations such that the characteristics of connections are one or more of quality of service, signal strength, and error rate.

65. The non-transitory server readable medium of claim 61, wherein the stored server-executable instructions are configured to cause a server to perform operations such that determining a location of a mobile device based on a network management signal received from the mobile device via the network interface comprises:
estimating separation distances between the mobile device and each of three or more Wi-Fi access points based on measured signal characteristics; and
estimating the location of the mobile device using the estimated separation distances and known locations of the three or more Wi-Fi access points using a trilateration algorithm.

66. The non-transitory server readable medium of claim 65, wherein the stored server-executable instructions are configured to cause a server to perform operations such that the signal characteristics are one or more of quality of service, signal strength, and error rate.

67. The non-transitory server readable medium of claim 61, wherein the stored server-executable instructions are configured to cause a server to perform operations further comprising:

determining whether a trigger has occurred, and wherein the stored server-executable instructions are configured to cause a server to perform operations such that adding the mobile device to the group upon determining the mobile device is located in the pairing zone comprises adding the mobile device to the group upon determining that the mobile device is located in the pairing zone and the trigger has occurred.

68. The non-transitory server readable medium of claim 67, wherein the stored server-executable instructions are configured to cause a server to perform operations such that the trigger is an expiration of a time period or a mobile device context.

69. The non-transitory server readable medium of claim 61, wherein the stored server-executable instructions are configured to cause a server to perform operations further comprising correlating the mobile device with user information.

70. The non-transitory server readable medium of claim 61, wherein the stored server-executable instructions are configured to cause a server to perform operations further comprising enabling group communications between the mobile device and any other mobile device that is a member of the group upon adding the mobile device to the group.

71. The non-transitory server readable medium of claim 61, wherein the stored server-executable instructions are configured to cause a server to perform operations further comprising:
tracking locations of all group member mobile devices;
determining whether the mobile device enters a trigger location and a trigger event occurs; and
sending a reward to the mobile device upon the mobile device entering the trigger location and the trigger event occurring.

72. The non-transitory server readable medium of claim 71, wherein the stored server-executable instructions are configured to cause a server to perform operations such that the reward is one or more of a coupon, discount, application, token, and advertisement.

73. The non-transitory server readable medium of claim 61, wherein the stored server-executable instructions are configured to cause a server to perform operations further comprising:
initiating a group location based challenge;
sending a group location challenge indication to all group member mobile devices;
tracking locations of all group member mobile devices;
determining whether the group location challenge is completed; and
sending a reward to all group member mobile devices upon completion of the group location challenge.

74. The non-transitory server readable medium of claim 73, wherein the stored server-executable instructions are configured to cause a server to perform operations such that the reward is one or more of a coupon, discount, application, token, and advertisement.

75. The non-transitory server readable medium of claim 61, wherein the stored server-executable instructions are configured to cause a server to perform operations further comprising:
receiving a group location request;
determining a current location of all group member mobile devices; and
generating a group location indication of determined current locations of all group member mobile devices.

76. The non-transitory server readable medium of claim 75, wherein the stored server-executable instructions are configured to cause a server to perform operations such that the group location indication is a map illustrating the determined current locations of all group member mobile devices.

77. The non-transitory server readable medium of claim 61, wherein the stored server-executable instructions are configured to cause a server to perform operations further comprising correlating user information of all mobile devices that are members of the group.

78. The non-transitory server readable medium of claim 61, wherein the stored server-executable instructions are configured to cause a server to perform operations such that at least a portion of the operations are performed during post event data analysis.

79. The non-transitory server readable medium of claim 61, wherein the stored server-executable instructions are configured to cause a server to perform operations such that the network management signal is an access point probe request.

80. The non-transitory server readable medium of claim 61, wherein the stored server-executable instructions are configured to cause a server to perform operations further comprising:
tracking the location of all group member mobile devices to generate a database of location history information; and
performing analytics on the database of location history information based on the group.

* * * * *